(12) United States Patent
Young et al.

(10) Patent No.: US 12,006,042 B2
(45) Date of Patent: Jun. 11, 2024

(54) AIRCRAFT GALLEY

(71) Applicant: The Boeing Company, Chicago, IL (US)

(72) Inventors: Stephen Young, Long Beach, CA (US); Julio Cesar Ojeda Gonzalez, Rancho Santa Margarita, CA (US); Rohit R. Sunny, Long Beach, CA (US); Gary S. Yeung, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 93 days.

(21) Appl. No.: 17/671,537

(22) Filed: Feb. 14, 2022

(65) Prior Publication Data

US 2023/0257120 A1    Aug. 17, 2023

(51) Int. Cl.
*B64D 11/04*    (2006.01)

(52) U.S. Cl.
CPC .................... *B64D 11/04* (2013.01)

(58) Field of Classification Search
CPC ...................................................... B64D 11/04
See application file for complete search history.

(56) References Cited

U.S. PATENT DOCUMENTS

| | | | |
|---|---|---|---|
| 10,205,339 B2 | 2/2019 | Augustat et al. | |
| 10,875,649 B2* | 12/2020 | Brown | B64D 11/04 |
| 2008/0001031 A1* | 1/2008 | Doebertin | B64D 11/04 244/118.1 |
| 2012/0217343 A1 | 8/2012 | Koschberg et al. | |
| 2013/0256249 A1* | 10/2013 | Burd | B64D 11/0015 211/153 |
| 2014/0034782 A1 | 2/2014 | Saeltzer et al. | |
| 2018/0222588 A1 | 8/2018 | Bajorat et al. | |
| 2019/0375508 A1 | 12/2019 | Schalla et al. | |

OTHER PUBLICATIONS

Extended European Search Report, Application No. 23156077.2, dated Jun. 12, 2023.

* cited by examiner

*Primary Examiner* — Richard G Davis
(74) *Attorney, Agent, or Firm* — Jordan IP Law, LLC

(57) ABSTRACT

A galley assembly is provided for an aircraft. The galley assembly includes a galley including a frame having modular compartments. The galley assembly includes a first module kit configured to be fit to at least one of the modular compartments. The first module kit configures the at least one modular compartment to receive a first component module of a first component type. The galley assembly includes a second module kit configured to be fit to the at least one modular compartment. The second module kit configures the at least one modular compartment to receive a second component module of a second component type that is different than the first component type.

20 Claims, 21 Drawing Sheets

AIRCRAFT GALLEY

BACKGROUND

Known aircraft galleys have fixed layouts wherein the components of the galley are located in dedicated compartments that are each capable of accepting only one particular type of component. For example, coffee makers are situated in designated compartments of the galley that have the necessary plumbing and electrical connections that enable operation of the coffee maker. Each other compartment of the galley is likewise configured for one specific component type, other examples of which include stowage units, ovens, other types of beverage makers (e.g., tea, hot water, etc.), waste containers, refrigerators, ice drawers, etc.

SUMMARY

In one aspect, a galley assembly is provided for an aircraft. The galley assembly includes a galley including a frame having modular compartments. The galley assembly includes a first module kit configured to be fit to at least one of the modular compartments. The first module kit configures the at least one modular compartment to receive a first component module of a first component type. The galley assembly includes a second module kit configured to be fit to the at least one modular compartment. The second module kit configures the at least one modular compartment to receive a second component module of a second component type that is different than the first component type.

In another aspect, an aircraft includes an airframe and a galley assembly held by the airframe. The galley assembly includes a galley including a frame having modular compartments. The galley assembly includes a first module kit configured to be fit to at least one of the modular compartments. The first module kit configures the at least one modular compartment to receive a first component module therein. The galley assembly includes a second module kit configured to be fit to the at least one modular compartment. The second module kit configures the at least one modular compartment to receive a second component module therein. The first and second component modules are of different first and second component types, respectively.

In another aspect, a method of configuring a galley of an aircraft is provided. The method includes fitting a first module kit to a modular compartment of the galley; installing a first component module of a first component type into the modular compartment such that the first module kit enables operation of the first component module; removing the first component module from the modular compartment; removing the first module kit from the modular compartment; fitting a second module kit to the modular compartment; and installing a second component module of a second component type into the modular compartment such that the second module kit enables operation of the second component module.

DETAILED DESCRIPTION

Figure 1:
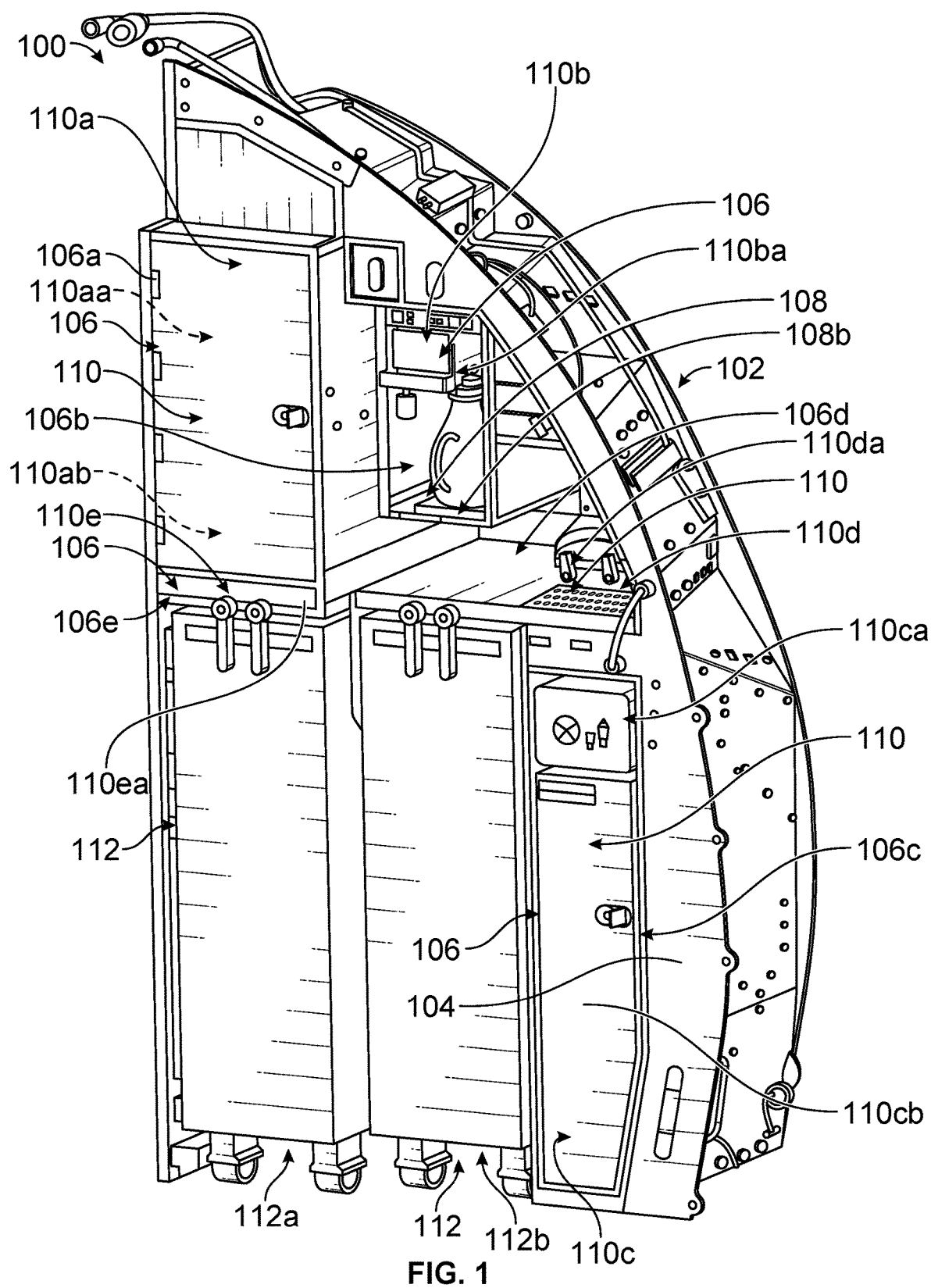
FIG. 1 is an isometric view of a galley assembly for an aircraft according to an implementation.

The foregoing summary, as well as the following detailed description of certain implementations will be better understood when read in conjunction with the appended drawings. While various spatial and directional terms, such as "top," "bottom," "upper," "lower," "vertical," and the like are used to describe implementations of the present application, it is understood that such terms are merely used with respect to the orientations shown in the drawings. The orientations can be inverted, rotated, or otherwise changed, such that a top side becomes a bottom side if the structure is flipped 180°, becomes a left side or a right side if the structure is pivoted 90°, and the like.

Known aircraft galleys have fixed layouts wherein the components of the galley (e.g., beverage makers, stowage units, ovens, waste containers, refrigerators, ice drawers, etc.) are located in dedicated compartments that are each capable of accepting only one particular type of component. The fixed predetermined locations of the components within the galley do not allow different component types to be interchanged within a particular compartment, thereby preventing customization of the galley layout.

Certain implementations provide a galley assembly for an aircraft. The galley assembly includes a galley including a frame having modular compartments. The galley assembly includes a first module kit configured to be fit to at least one of the modular compartments. The first module kit configures the at least one modular compartment to receive a first component module of a first component type. The galley assembly includes a second module kit configured to be fit to the at least one modular compartment. The second module kit configures the at least one modular compartment to receive a second component module of a second component type that is different than the first component type.

Certain implementations provide galley assemblies that function in an unconventional manner to provide a modular layout of compartments for component modules. The modular layout of the modular compartments of the galley assembly enables component modules of different component types to be interchanged within the modular compartments. For example, certain implementations of the interchangeable module kits disclosed herein can be selectively fit to a modular compartment to configure the modular compartment to accept different types of component modules. Certain implementations increase the flexibility of the design and/or operation of galley assemblies, for example by enabling a user to customize the galley (e.g., adapt the galley for different needs, change the layout of the galley, etc.), etc. In one example, existing galleys can be retrofit with new component modules that have been developed to serve new and/or improved purposes. Certain implementations reduce costs associated with operating an aircraft galley, for example by enabling the user to customize only a portion of the galley assembly, etc. Certain implementations of the galley assemblies disclosed herein provide modular compartments that are configured to accept component modules of one or more types that have not previously been accepted (and thus used within) the compartments of known aircraft galleys. For example, certain implementations of the galley assemblies disclosed herein provide module kits that can be selectively fit to a modular compartment to configure the modular compartment to accept an electrical charging station (e.g., a USB charging station, etc.).

Figure 2:
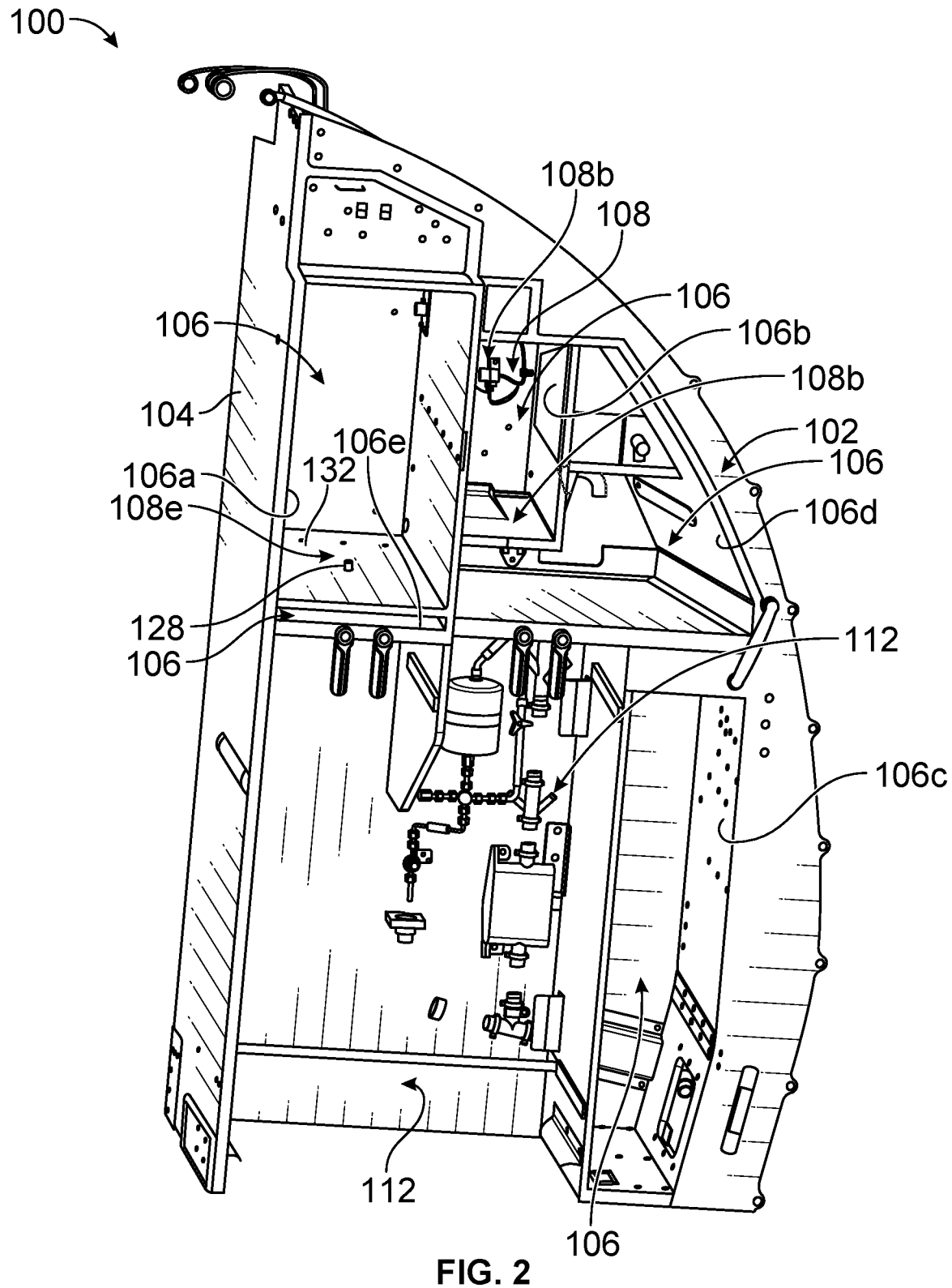
FIG. 2 is an isometric view of a galley of the galley assembly shown in FIG. 1 according to an implementation.
Figure 3:
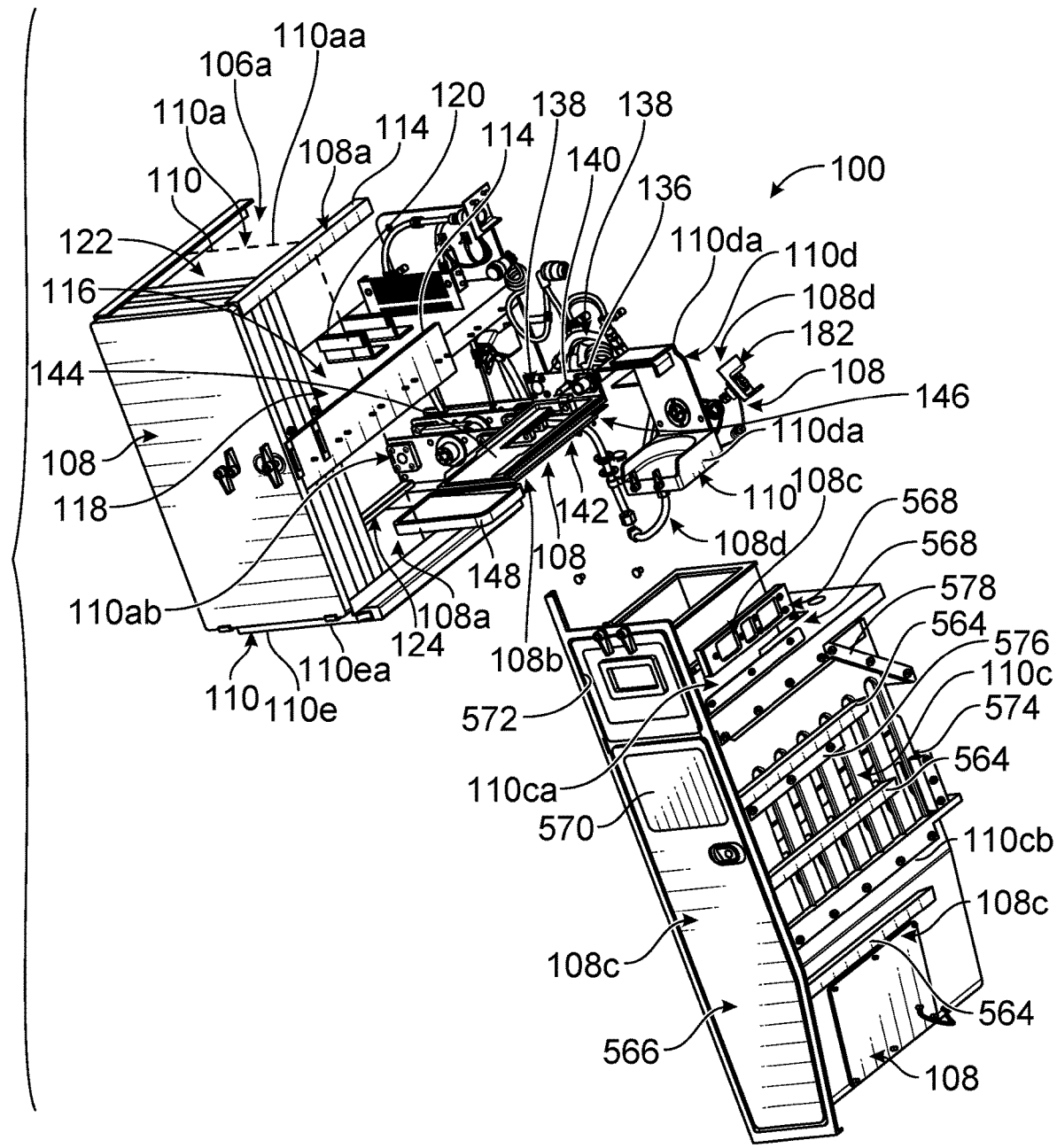
FIG. 3 is an isometric view of module kits and component modules of the galley assembly shown in FIG. 1 according to an implementation.

With references now to FIGS. 1-3, a galley assembly 100 for an aircraft (e.g., the aircraft 1000 shown in FIG. 20, etc.) includes a galley 102 (not shown in FIG. 3). The galley 102 includes a frame 104 that includes a plurality of modular compartments 106. In other words, the geometry of the frame 104 of the galley 102 is divided into the modular compartments 106. The galley assembly 100 includes interchangeable module kits 108 and interchangeable component modules 110 (not shown in FIG. 2 or 3). The module kits 108 are configured to be selectively fit to the modular compartments 106 to configure the modular compartments 106 to receive (i.e., accept) different component types (e.g., families, etc.) of the component modules 110. For example, when fit to a particular modular compartment 106, each interchangeable module kit 108 configures the modular compartment 106 to receive (i.e., accept) a component module 110 of the particular component type that corresponds to the module kit 108.

Each module kit 108 is designed to selectively configure a modular compartment 106 to receive a component module 110 of a different corresponding component type therein. Each module kit 108 includes the structure, component(s), geometry, feature(s), and/or the like that enable the support and operation (i.e., function) of the component module 110 of the particular corresponding component type within the modular compartment 106. Examples of structure, component(s), geometry, feature(s), and/or the like of the module kits 108 that enable the support and operation of the component modules 110 within the modular compartments 106 include, but are not limited to, rubstrips, shelves, brackets, rails, back wall assemblies, dividers, mating pins, drip trays, trim, screens, doors, stops, fasteners, back adapter assemblies, fittings (e.g., gas plumbing fittings, refrigerant plumbing fittings, water plumbing fittings, pneumatic fittings, hydraulic fittings, etc.), conduits, tubes, cables, gas lines, water lines, air lines, refrigerant lines, drains, sump assemblies, and/or the like. Examples of various module kits 108 for various different component modules 110 are shown and described below with respect to FIGS. 4-15.

Accordingly, different module kits 108 can be selectively interchanged within the same modular compartment 106 to selectively configure the modular compartment 106 to receive component modules 110 of different component types. For example, a modular compartment 106 can be fit with a first module kit 108 that configures the modular compartment 106 to receive a component module 110 of a first component type. The same modular compartment 106 can be reconfigured to receive another component module 110 of a different second component type by replacing the first module kit 108 with a second module kit 108 designed to configure the modular compartment 106 to receive the component module 110 of the second component type. After the first and second module kits 108 have been interchanged, a component module 110 of the second component type can be inserted (e.g., installed, etc.) into the modular compartment 106 to replace the component module 110 of the first component type. The interchangeable module kits 108 thereby provide the galley assembly 100 with a modular layout of the compartments 106, which enables component modules 110 of different component types to be interchanged within the same modular compartment.

Examples of different component types of the component modules 110 include, but are not limited to, beverage makers, warming stations, electrical charging stations, Universal Serial Bus (USB) charging stations, stowage units, ovens, waste containers, self-contained boxes, refrigerators, ice makers, ice drawers, pull-out tables, and/or the like. In the exemplary implementation of FIGS. 1-3, five component modules 110 and five module kits 108 are shown. Specifically, the galley 102 includes: modular compartments 106*a*, 106*b*, 106*c*, 106*d*, and 106*e*; module kits 108*a*, 108*b*, 108*c*, 108*d*, and 108*e* fit to the modular compartments 106*a*, 106*b*, 106*c*, 106*d*, and 106*e* respectively; and component modules 110*a*, 110*b*, 110*c*, 110*d*, and 110*e* installed into the modular compartments 106*a*, 106*b*, 106*c*, 106*d*, and 106*e*, respectively. In the exemplary implementation, the component module 110*a* includes two stowage units 110*aa* and 110*ab* (e.g., standard stowage units, self-contained boxes, etc.), the component module 110*b* includes a coffee maker 110*ba*, the component module 110*c* includes an ice drawer 110*ca* and a waste container 110*cb*, the component module 110*d* includes a hot cup 110*da*, and the component module 110*e* includes a pull-out table 110*ea*.

In the exemplary implementation of FIGS. 1-3, the module kit 108*a* configures the modular compartment 106*a* to receive component modules 110 of the component type of a stowage unit (e.g., the stowage units 110*aa* and 110*ab*, etc.). In some implementations, the galley assembly 100 includes one or more module kits 108 (e.g., the module kit 258 shown in FIG. 7, etc.) that configure the modular compartment 106*a* to receive component modules 110 having the component type of an oven. For example, the galley assembly 100 may include a module kit 108 that configures the modular compartment 106*a* to receive a convection oven module 110, a module kit 108 that configures the modular compartment 106*a* to receive a steam oven module 110, a module kit 108 that configures the modular compartment 106*a* to receive an extended convection oven module 110, a module kit 108 that configures the modular compartment 106*a* to receive an extended steam oven module 110, and/or the like.

In some implementations, the galley assembly 100 includes one or more module kits 108 (e.g., the module kit 258 shown in FIG. 7, etc.) that configure the modular compartment 106a to receive component modules 110 having the component type of a refrigerator. In another example, the galley assembly 100 includes one or more module kits 108 (e.g., the module kit 208 shown in FIG. 6, etc.) that configure the modular compartment 106a to receive component modules 110 having the component type of miscellaneous stowage components (e.g., doors, shelves, trim, panels, dividers, walls, etc.).

The exemplary module kit 108b of the exemplary implementation of FIGS. 1-3 configures the modular compartment 106b to receive component modules 110 of the component type of a beverage maker (e.g., the coffee maker 110ba shown in FIG. 1, etc.). Optionally, the galley assembly 100 includes one or more module kits 108 that configure the modular compartment 106b to receive component modules 110 having another type of beverage maker (e.g., a tea brewer, a water heater and/or boiler, a hot chocolate maker, an espresso and/or cappuccino maker, a frozen beverage machine, a snow cone machine, etc.). Another example of one or more module kits 108 of the galley assembly 100 include a module kit 108 (e.g., the module kit 358 shown in FIG. 10, etc.) that configures the modular compartment 106b to receive component modules 110 having the component type of miscellaneous stowage components (e.g., doors, shelves, trim, panels, dividers, walls, etc.). In some implementations, one or more module kits 108 of the galley assembly 100 includes a module kit 108 that configures the modular compartment 106b to receive an ice maker module 110.

In the exemplary implementation of FIGS. 1-3, the module kit 108c configures the modular compartment 106c to receive component modules 110 of the component type of ice drawer and waste container (e.g., the ice drawer 110ca and the waste container 110cb, etc.). In some implementations, the galley assembly 100 includes one or more module kits 108 (e.g., the module kit 458 shown in FIG. 13, etc.) that configure the modular compartment 106c to receive component modules 110 having the component type of a full size waste container. Other examples include one or more module kits 108 (e.g., the module kit 508 shown in FIG. 14, etc.) that configure the modular compartment 106c to receive component modules 110 having the component type of miscellaneous stowage components (e.g., doors, shelves, trim, panels, dividers, walls, etc.) and/or one or more module kits 108 (e.g., the module kit 608 shown in FIG. 15, etc.) that configure the modular compartment 106c to receive component modules 110 having the component type of ice drawer with miscellaneous stowage components (e.g., doors, shelves, trim, panels, dividers, walls, etc.).

The exemplary module kit 108d of the exemplary implementation of FIGS. 1-3 configures the modular compartment 106d to receive component modules 110 of the component type of a warming station (e.g., the hot cup 110da, etc.). In some implementations, the galley assembly 100 includes one or more module kits 108 (e.g., the module kit 408 shown in FIG. 11, etc.) that configures the modular compartment 106d to receive component modules 110 having the component type of an electrical charging station.

The exemplary module kit 108e shown in the exemplary implementation of FIGS. 1-3 configures the modular compartment 106e to receive component modules 110 of the component type of a pull-out table (e.g., the pull-out table 110ea, etc.). In some implementations, the galley assembly 100 includes one or more module kits 108 (e.g., the module kit 108e, another module kit 108, etc.) that configures the modular compartment 106e to receive component modules 110 having the component type of a cover (e.g., the cover 110eb shown in FIG. 9, etc.), for example in implementations wherein the modular compartment 106e is selected as not including a pull-out table.

Although shown as having five modular compartments 106, the galley 102 may include any other number of modular compartments 106. Any number of module kits 108 may be used with the galley assembly 100 to enable the modular compartments 106 to selectively receive any number of component modules 110 and any number of different component types. Each of the module kits 108 (e.g., the module kits 108a, 108b, 108c, 108d, 108e, etc.) may be referred to herein as a "first" and/or a "second" module kit. Each of the component modules 110 (e.g., the component modules 110a, 110b, 110c, 110d, 110e, 110aa, 110ab, 110ba, 110ca, 110cb, 110da, 110ea, etc.) may be referred to herein as a "first" and/or a "second" component module. Any of the component types described and/or illustrated herein may be referred to herein as a "first" and/or a "second" component type.

In the exemplary implementation, the galley 102 includes two non-modular compartments 112a and 112b (e.g., configured to receive a stowage cart, etc.), but the galley 102 may include any other number of non-modular compartments 112. In some other implementations, the compartment 112a and/or 112b is a modular compartment 110 (i.e., capable of being fit with the interchangeable module kits 108 to selectively interchange component modules 110 of different component types).

Figure 4:
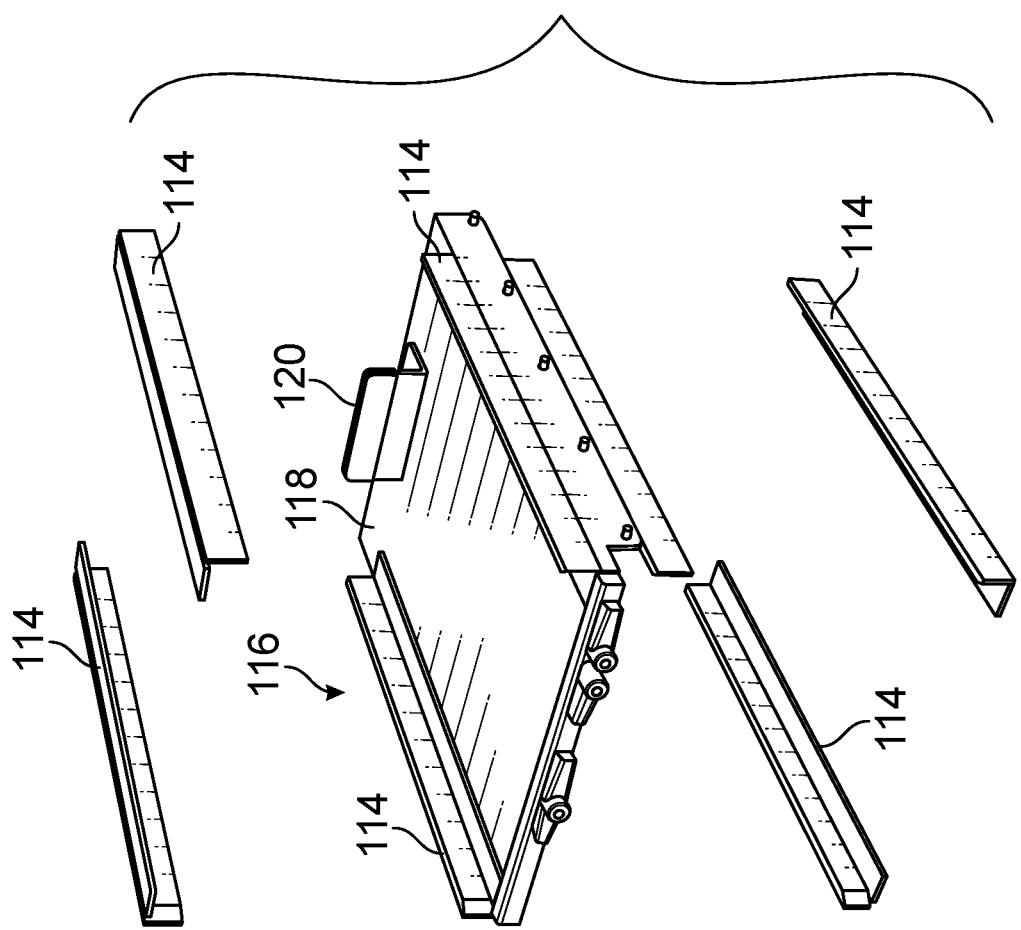
FIG. 4 illustrates a module kit for a stowage unit according to an implementation.
Figure 4:
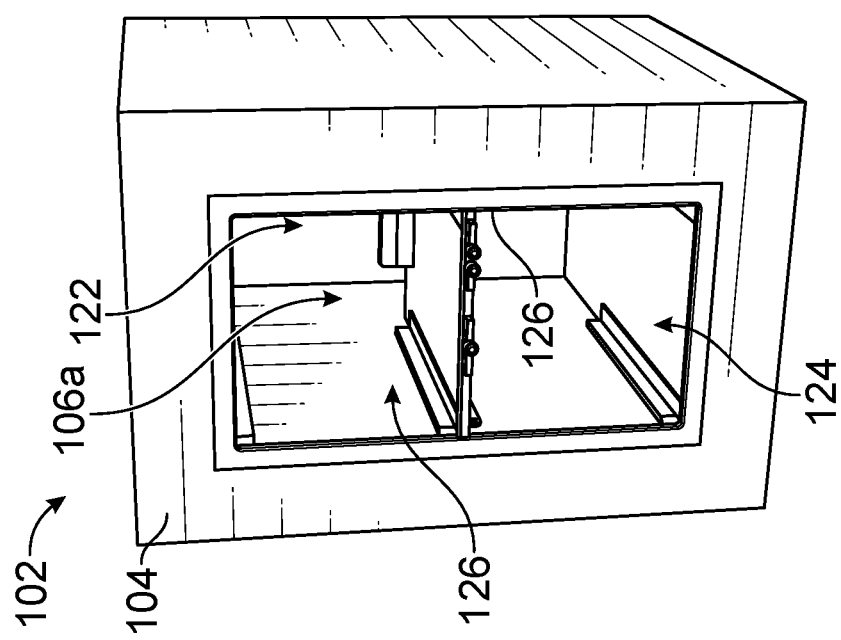

Referring now to FIGS. 3 and 4, as described above, the exemplary module kit 108a configures the modular compartment 106a of the galley 102 to receive component modules 110 (not shown in FIG. 4) of the component type of a stowage unit (e.g., the stowage units 110aa and 110ab shown in FIGS. 1 and 3, etc.). The exemplary implementation of the module kit 108a shown in FIG. 4 includes rubstrips 114 and a shelf assembly 116.

The shelf assembly 116 includes a shelf 118 and a back stop 120 held by the shelf 118. The shelf assembly 116 divides the modular compartment 106a into two sub-compartments 122 and 124 that are each configured (e.g., sized, etc.) to receive and hold the stowage units 110aa and 110ab therein, respectively. In the exemplary implementation, the stowage units 110aa and 110ab are standard stowage units (e.g., self-contained boxes having a standardized size, etc.), but any other type and number of stowage units may be configured by the module kit 108a to be received into the modular compartment 106a. The optional back stop 120 is configured to limit the depth of the stowage unit 110aa within the corresponding sub-compartment 122. In some implementations, a clearance (e.g., approximately 0.015 inches, between approximately 0.014 inches and approximately 0.016 inches, etc.) between the shelf assembly 116 and side walls 126 of the frame 104 that define the modular compartment 106a is selected to facilitate inserting the shelf assembly 116 into, and removing the shelf assembly 116 from, the modular compartment 106a.

The rubstrips 114 are configured to engage corresponding stowage units 110aa and 110ab to facilitate supporting the stowage units 110aa and 110ab in place within the modular compartment 106a. Any number of rubstrips 114 may be provided. In some implementations, a clearance (e.g., approximately 0.15 inches, between approximately 0.14 inches and approximately 0.16 inches, etc.) between the stowage units 110aa and 110ab and the rubstrips 114 is selected to facilitate inserting the stowage units 110aa and 110ab into, and removing the stowage units 110aa and 110ab from, the respective sub-compartment 122 and 124, while also supporting the stowage units 110aa and 110ab within the respective sub-compartments 122 and 124. In some implementations, the clearance between the stowage units 110aa and 110ab and the rubstrips 114 eliminates the need for trim pieces, which reduces the complexity, and therefore the cost, of the galley assembly 100 and may reduce the likelihood of undesirable vibration, noise, and/or the like.

Accordingly, the exemplary module kit 108a configures the modular compartment 106a of the galley 102 to receive component modules 110 of the component type of a stowage unit, and more specifically the stowage units 110aa and 110ab. The various components of the module kit 108a (e.g., the shelf assembly 116, the rubstrips 114, etc.) may be fit to the modular compartment 106a using any suitable method, means, structure, fastener, and/or the like, such as, but not limited to, threaded fasteners, clamps, clips, rivets, devises, pins, cables, straps, hook and loop fasteners, adhesive, bonding, welding, and/or the like. In some implementations, one or more components of the module kit 108a (e.g., the shelf assembly 116, the rubstrips 114, etc.) may be standardized across other module kits 108 (e.g., the module kit 108a may share one or more components with the module kit 158 shown in FIG. 5, etc.).

Figure 5:
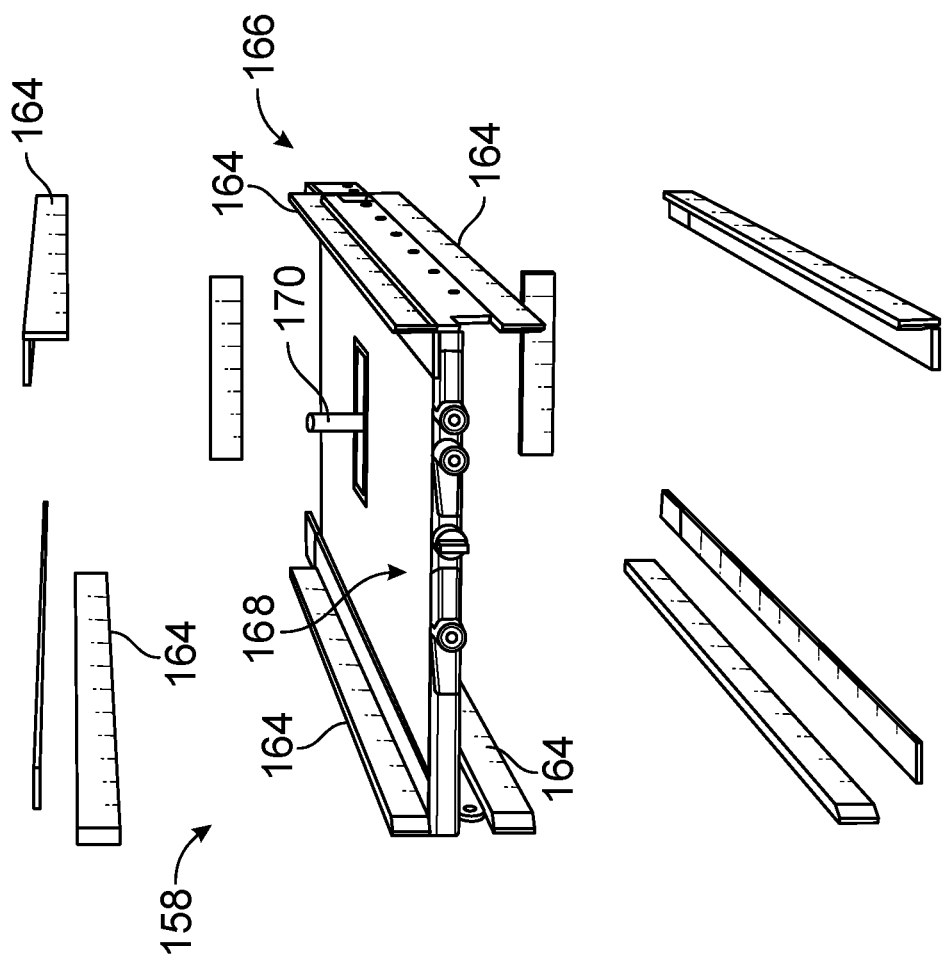
FIG. 5 illustrates a module kit for a stowage unit according to an implementation.
Figure 5:
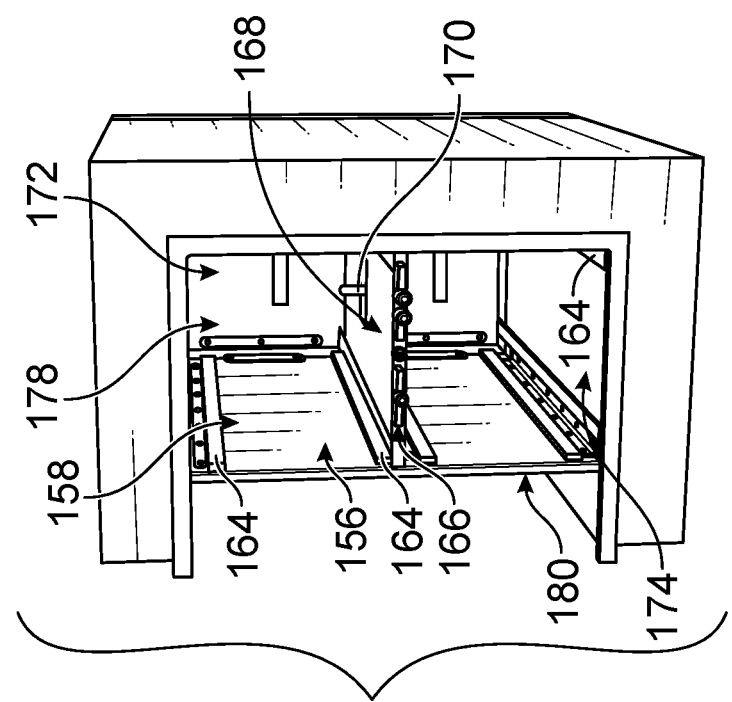

Referring now to FIG. 5, another exemplary implementation of a module kit 158 configures a modular compartment 156 to receive component modules 110 (not shown in FIG. 5) of the component type of a stowage unit (e.g., double deep standard units, etc.). The exemplary implementation of the module kit 158 shown in FIG. 5 includes rubstrips 164 and a shelf assembly 166. The shelf assembly 166 includes a shelf 168 and a back stop 170 held by the shelf 168. The shelf assembly 166 divides the modular compartment 106 into two sub-compartments 172 and 174 that are each configured (e.g., sized, etc.) to receive and hold stowage units. Optionally, the module kit 158 includes a back wall assembly 178 and/or a divider assembly 180.

Figure 6:
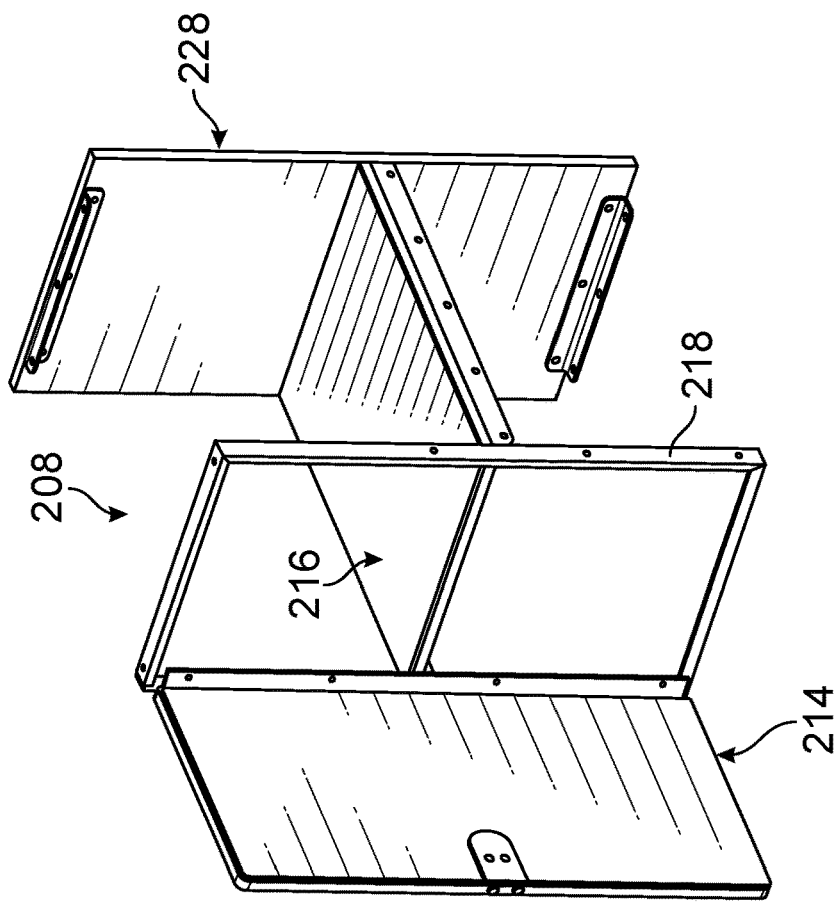
FIG. 6 illustrates a module kit for miscellaneous stowage components according to an implementation.
Figure 6:
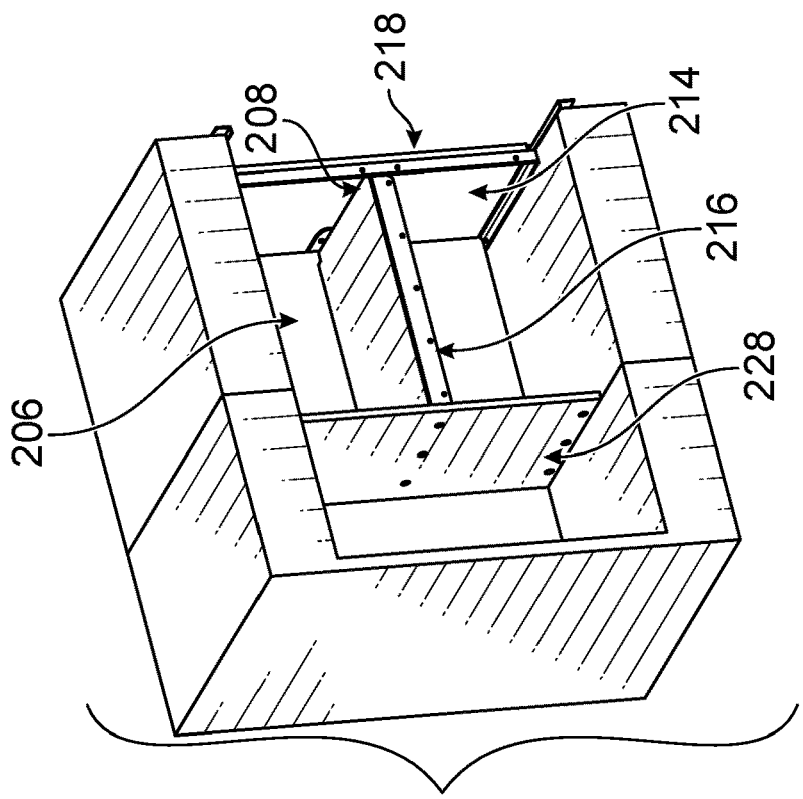

FIG. 6 illustrates another exemplary implementation of a module kit 208. The module kit 208 configures a modular compartment 206 to receive component modules 110 (not shown in FIG. 6) of the component type of miscellaneous stowage components (e.g., doors, shelves, trim, panels, dividers, walls, etc.). The module kit 208 thus configures the modular compartment 206 as a miscellaneous stowage compartment. The exemplary implementation of the module kit 208 shown in FIG. 6 includes a door assembly 214, and an optional shelf assembly 216, and a door frame 218. Optionally, the module kit 208 includes a back wall assembly 228.

Figure 7:
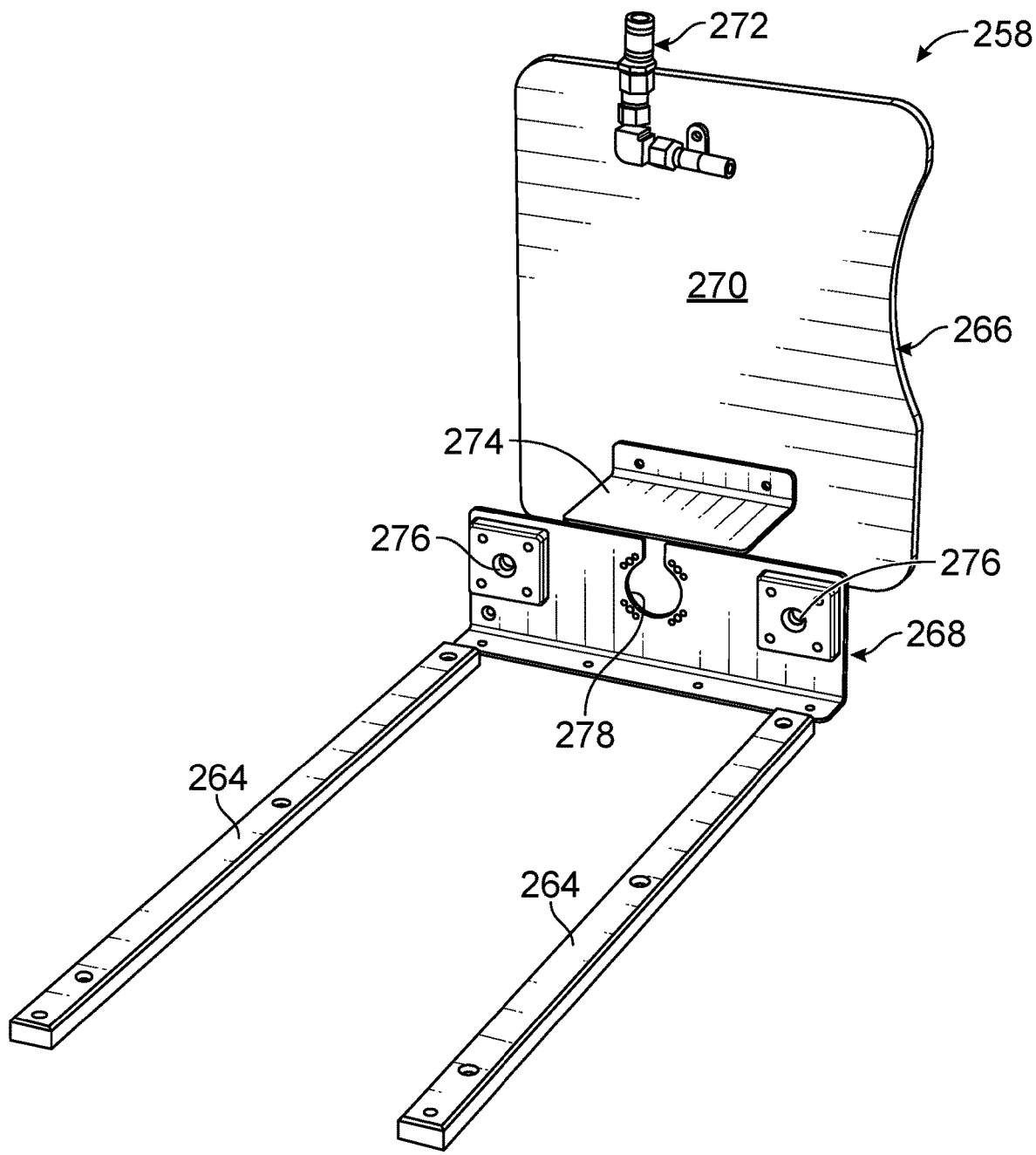
FIG. 7 illustrates a module kit for an oven and/or a refrigerator according to an implementation.

Referring now to FIG. 7, another exemplary implementation of a module kit 258 configures a modular compartment (e.g., the modular compartment 106a shown in FIGS. 1-3, etc.) to receive component modules 110 (not shown in FIG. 7) of the component type of an oven (not shown; e.g., steam oven, convention oven, etc.). The exemplary implementation of the module kit 258 shown in FIG. 7 includes rubstrips 264, a back adapter assembly 266, and an oven bracket 268.

The back adapter assembly 266 has an arrangement, configuration, layout, and/or the like that is complementary with the oven module 110. For example, the back adapter assembly 266 includes the connections, components, and/or the like (e.g., electrical connections, water connections, gas connections, pneumatic connections, hydraulic connections, electrical lines and/or fittings, water lines and/or fittings, gas lines and/or fittings, pneumatic lines and/or fittings, hydraulic lines and/or fittings, mechanical connections, structural connections, conduits, tubes, cables, etc.) that enable operation of the oven module 110 within the modular compartment. In the exemplary implementation, the back adapter assembly 266 includes a panel 270 and a water plumbing fitting 272 mounted to the panel 270. The water plumbing fitting 272 is configured to supply the oven module 110 with water from a water source. Optionally, the back adapter assembly 266 includes a drip shield 274, for example mounted to the panel 270.

The oven bracket 268 has an arrangement, configuration, layout, and/or the like that is complementary with the oven module 110. For example, the oven bracket 268 is configured to selectively mate with the oven module 110. In the exemplary implementation, the oven bracket 268 mates with the oven module 110 via one or more openings 276 that receive pins (not shown) of the oven module 110 therein. Optionally, the oven bracket 268 includes an opening 278 for receiving an electrical cord (not shown) of the oven module 110.

In addition or alternatively to configuring the modular compartment to receive an oven module 110, the module kit 258 may configure the modular compartment to receive component modules 110 of the component type of a refrigerator (not shown). For example, the back adapter assembly 266 may have an arrangement, configuration, layout, and/or the like that is complementary with a refrigerator module 110. For example, the back adapter assembly 266 includes the connections, components, and/or the like (e.g., electrical connections, water connections, refrigerant connections, pneumatic connections, hydraulic connections, electrical lines and/or fittings, water lines and/or fittings, refrigerant lines and/or fittings, pneumatic lines and/or fittings, hydraulic lines and/or fittings, mechanical connections, structural connections, conduits, tubes, cables, etc.) that enable operation of the refrigerator module 110 within the modular compartment. Similarly, the oven bracket 268 may have an arrangement, configuration, layout, and/or the like that is complementary with the refrigerator module 110. For example, the oven bracket 268 may configured to selectively mate with the refrigerator module 110 (e.g., via the openings 276, etc.). Optionally, the opening 278 is configured to receive an electrical cord (not shown) of the refrigerator module 110.

Figure 8:
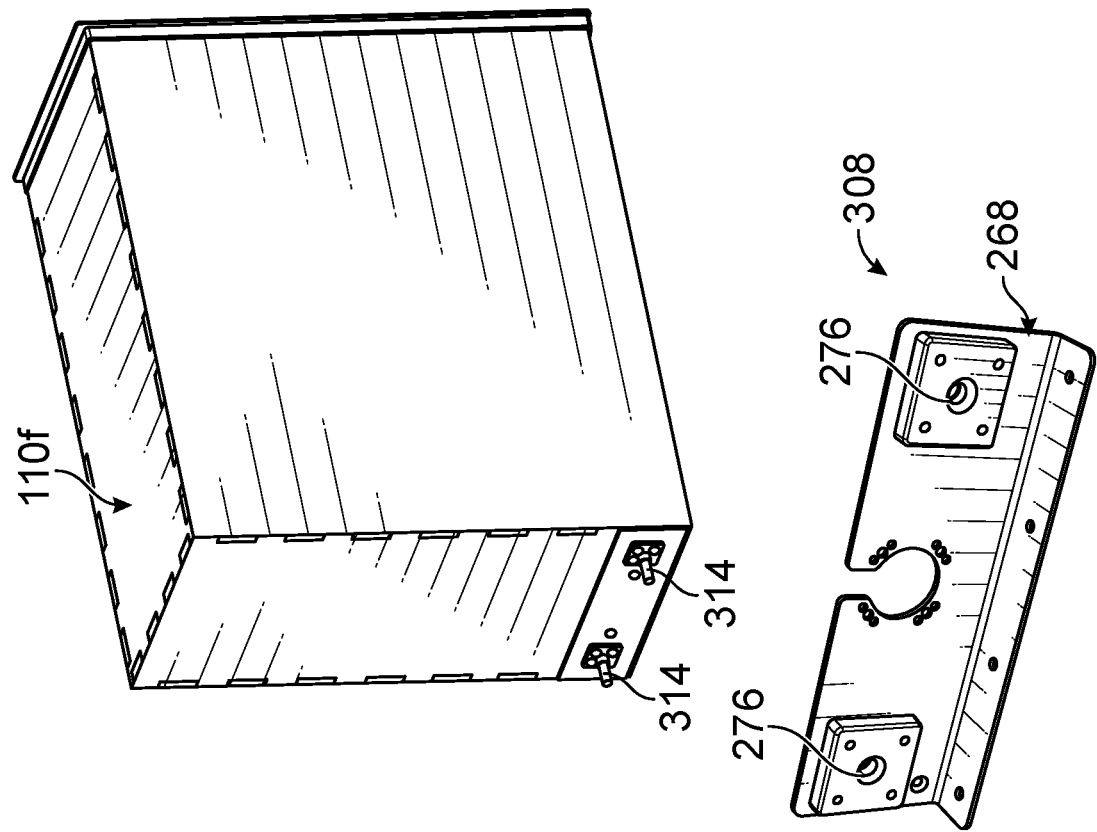
FIG. 8 illustrates a module kit for a stowage unit according to an implementation.
Figure 8:
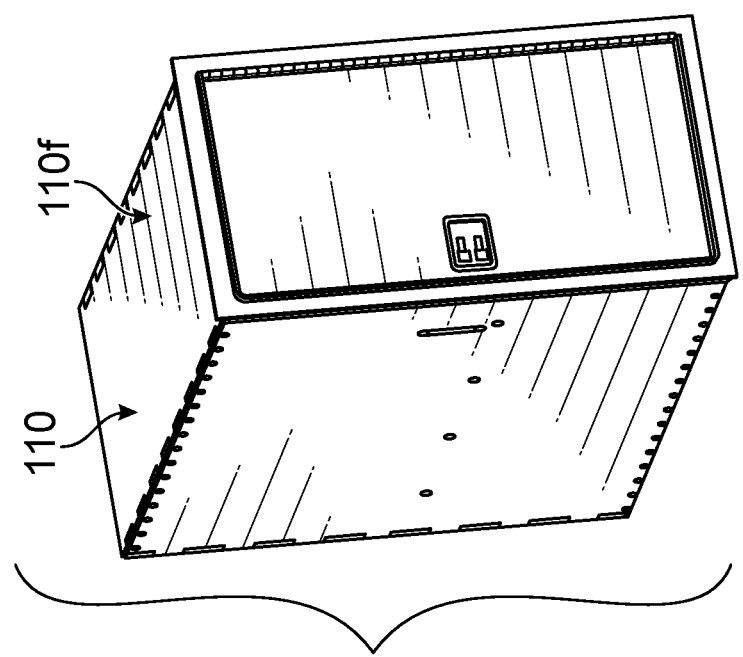

Referring now to FIG. 8, in some implementations, the oven bracket 268 (and/or one or more other components of the module kit 258 shown in FIG. 7) defines a module kit 308 that configures a modular compartment (e.g., the modular compartment 106a shown in FIGS. 1-3, etc.) to receive component modules 110 of the component type of a stowage unit. For example, in the exemplary implementation of FIG. 8, the oven bracket 268 is configured to selectively mate with a stowage unit 110f, which in the exemplary implementation is a self-contained box. In the exemplary implementation, the oven bracket 268 mates with the stowage unit 110f via the one or more openings 276, which receive pins 314 of the stowage unit 110f therein. The oven bracket 268 is thus an example of a component that may be standardized across other module kits 108 (e.g., across the module kits 258 and 308, etc.).

Figure 9:
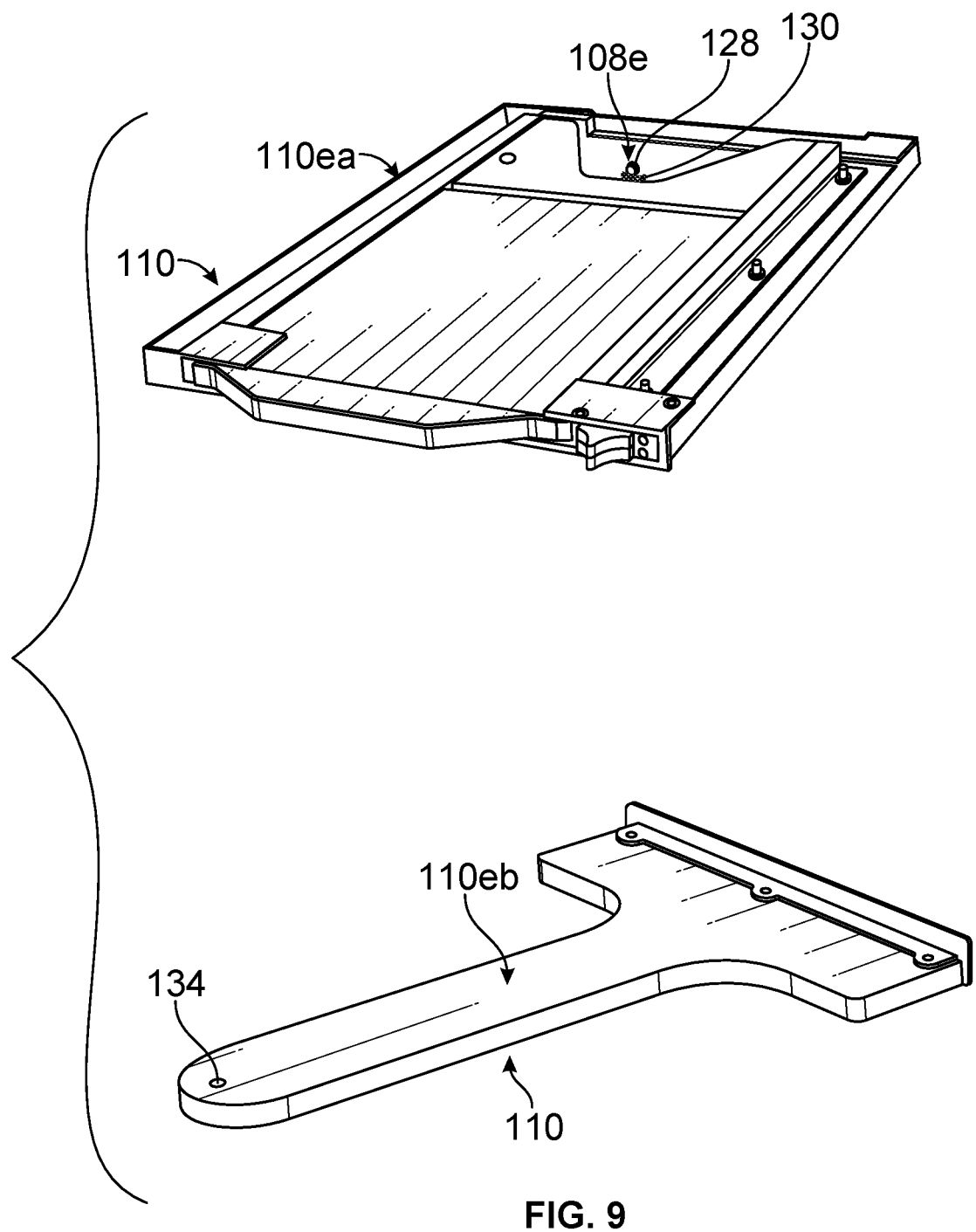
FIG. 9 illustrates a module kit for a pull-out table and/or cover according to an implementation.

FIG. 9 illustrates an exemplary implementation of the module kit 108e, which as described above configures the modular compartment 106e to receive component modules 110 of the component type of a pull-out table (e.g., the pull-out table 110ea, etc.). Referring now to FIGS. 2 and 9, the module kit 106e includes a fastener 128 that is configured to be received through an opening 130 within the pull-out table 110ea to fasten the pull-out table 110ea to a bottom wall 132 of the modular compartment 106e. In some implementations, module kit 106e also configures the modular compartment 106e to receive component modules 110 having the component type of a cover (e.g., the cover 110eb, etc.), for example in implementations wherein the modular compartment 106e is selected as not including a pull-out table. For example, the fastener 128 may be configured to be received through an opening 134 within the cover 110eb to fasten the cover 110eb to the bottom wall 132 of the modular compartment 106e. The fastener 128 is thus an example of a component that may be standardized across other module kits 108.

Figure 10:
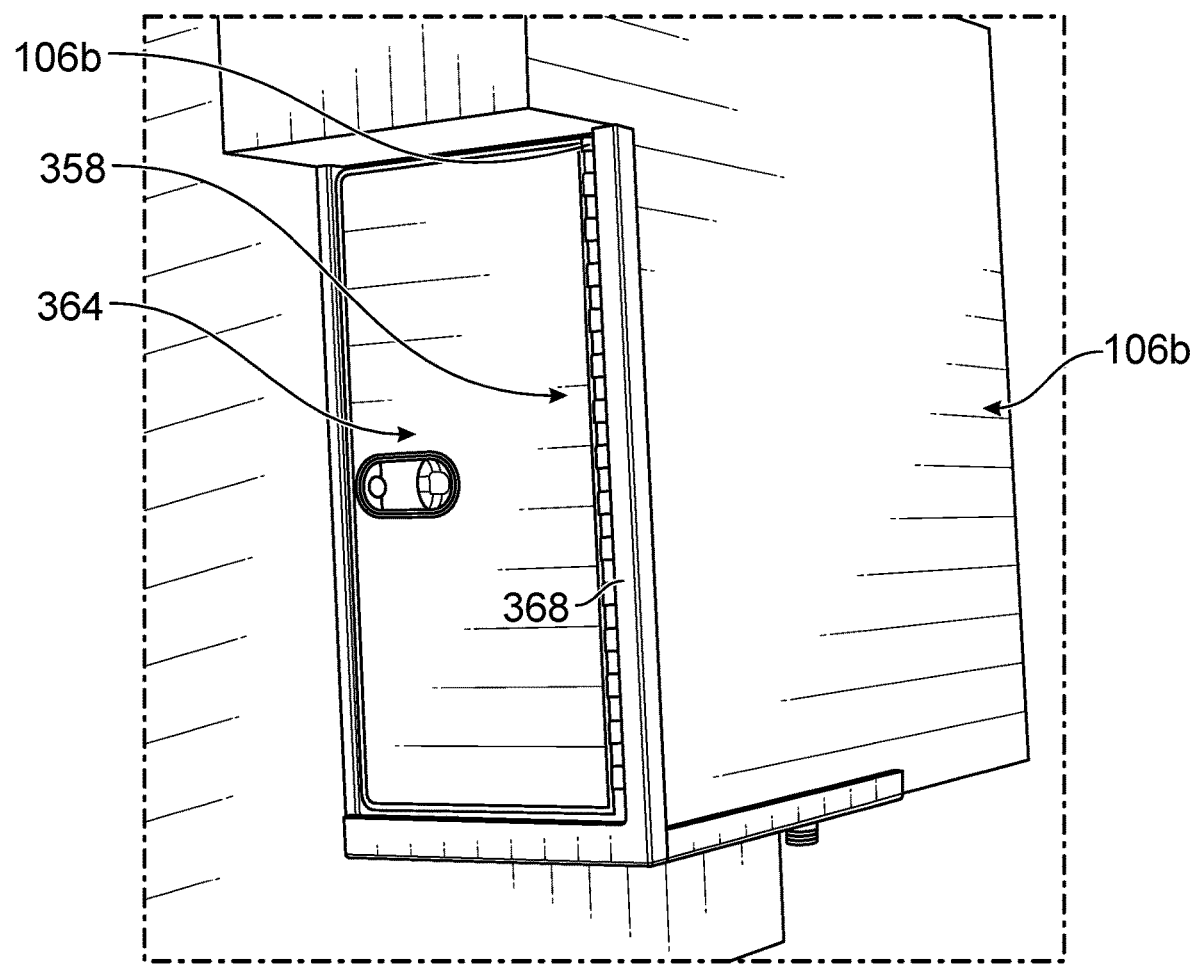
FIG. 10 illustrates a module kit for miscellaneous stowage components according to an implementation.

FIG. 10 illustrates another exemplary implementation of a module kit 358. The module kit 358 configures the modular compartment 106b to receive component modules 110 of the component type of miscellaneous stowage components (e.g., doors, shelves, trim, panels, dividers, walls, etc.). The module kit 358 thus configures the modular compartment 106b as a miscellaneous stowage compartment. The exemplary implementation of the module kit 358 shown in FIG. 10 includes a door assembly 364 and a door frame 368.

Referring again to FIG. 3, an exemplary implementation of the module kit 108b configures the modular compartment 106b to receive component modules 110 of the component type of a beverage maker (e.g., the coffee maker 110ba shown in FIG. 1, a tea brewer, a water heater and/or boiler, a hot chocolate maker, an espresso and/or cappuccino maker, a frozen beverage machine, a snow cone machine, etc.). The module kit 108b includes the connections, components, and/or the like (e.g., electrical connections, water connections, gas connections, pneumatic connections, hydraulic connections, electrical lines and/or fittings, water lines and/or fittings, gas lines and/or fittings, pneumatic lines and/or fittings, hydraulic lines and/or fittings, mechanical connections, structural connections, conduits, tubes, cables, etc.) that enable operation of the coffee maker 110ba within the modular compartment 106b. In the exemplary implementation, the module kit 108b includes an electrical connector 136 that is connected to a source of electrical power (not shown), a water connection assembly 138 that is connected to a water source (not shown), and an optional mating pin 140. The electrical connector 136 provides the coffee maker 110ba with an electrical connection to the source electrical power, while the water connection assembly 138 provides the coffee maker 110ba with a connection to the source of water. The mating pin 140 is configured to selectively mate with the coffee maker 110ba.

Figure 11:
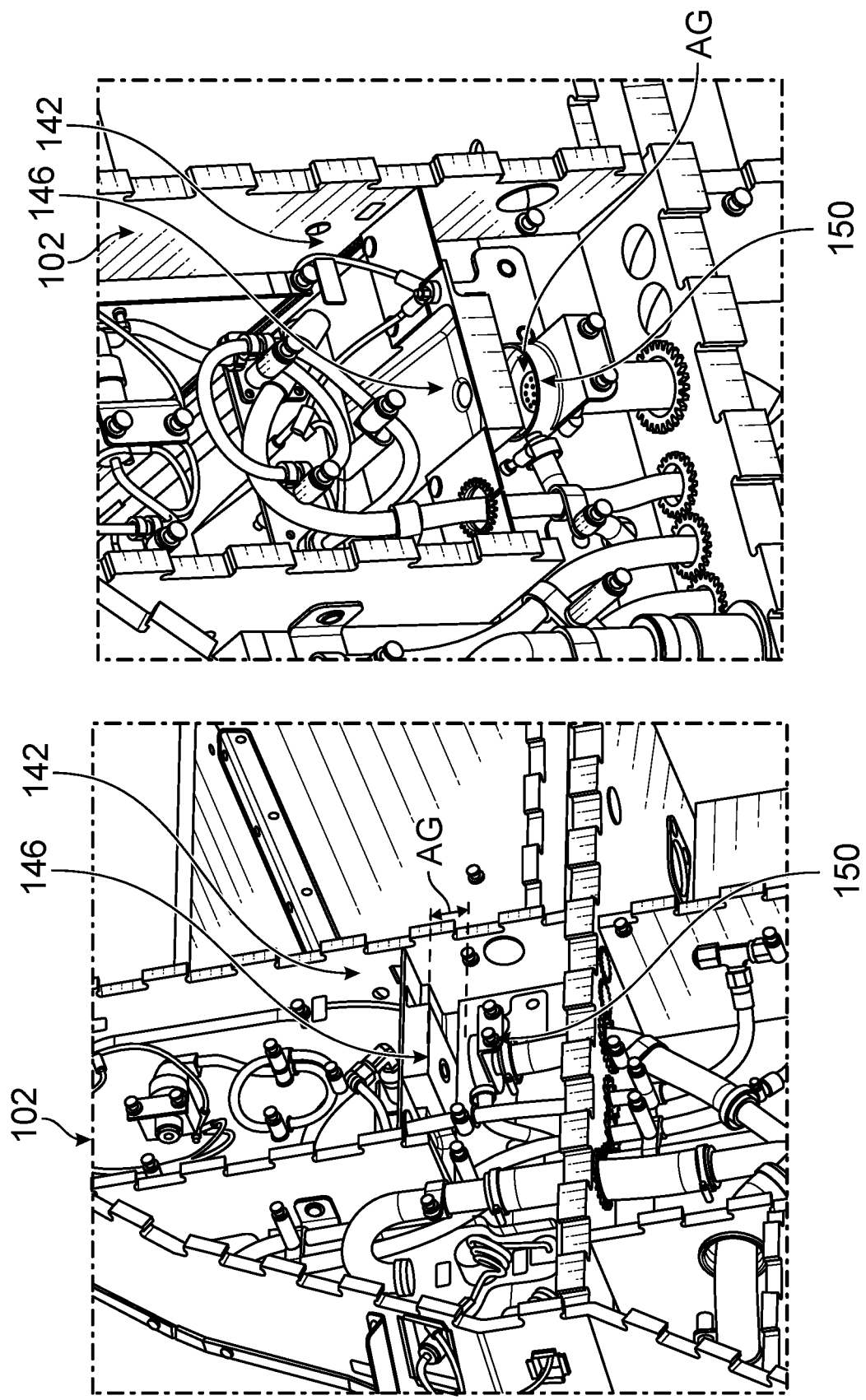
FIG. 11 illustrates a sump assembly according to an implementation.

In the exemplary implementation, the module kit 108b includes a sump assembly 142. The sump assembly 142 includes a catch tray 144 having a drain sub-assembly 146. The sump assembly 142 is configured to provide a drain for draining fluid from the coffee maker 110ba. Optionally, the module kit 108b includes a drip tray 148. As shown in FIG. 11, the sump assembly 142 includes an air gap AG (e.g., an approximately vertical air gap, etc.) that extends between the drain sub-assembly 146 of the sump assembly 142 and a drain 150 of the galley 102.

Figure 12:
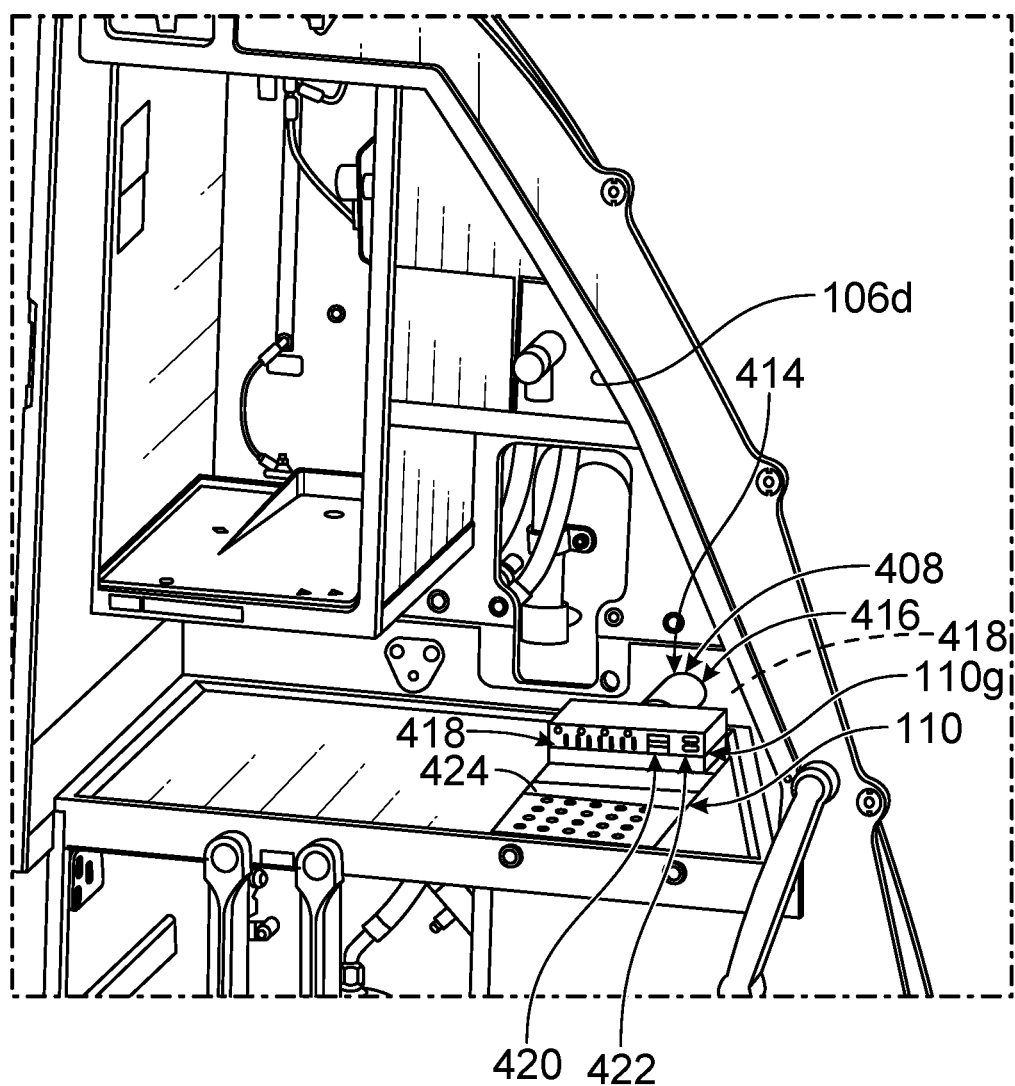
FIG. 12 illustrates a module kit for an electrical charging station according to an implementation.

FIG. 12 illustrates a module kit 408 that configures a modular compartment (e.g., the modular compartment 106d, etc.) to receive component modules 110 having the component type of an electrical charging station (e.g., the electrical charging station 110g shown in FIG. 12, etc.). The module kit 408 thus configures the modular compartment as a charging station wherein users can charge personal and/or portable electronic devices. The exemplary implementation of the module kit 408 shown in FIG. 12 includes an electrical cable 414 that is connected to a source of electrical power (not shown). In some implementations, an end portion 416 of the electrical cable 414 includes an electrical connector (not shown; e.g., a plug, a receptacle, etc.) that is configured to mate with a complementary connector (not shown) of the electrical charging station 110g. In other implementations, the end portion 416 of the electrical cable 414 is configured to be hardwired to the electrical charging station 110g.

The electrical charging station 110g may include any type and any number of ports, outlets, and/or the like, such as, but not limited to, two-prong electrical outlets, three-prong electrical outlets, four-prong electrical outlets, USB ports, USB 1.1 ports, USB 2.0 ports, USB 3.0 ports, USB-C ports, USB-A ports, USB-B ports, Mini-A USB ports, Mini-B USB ports, Micro-A USB ports, Micro-B USB ports, lightening ports, thunderbolt ports, and/or the like. In the exemplary implementation shown in FIG. 12, the electrical charging station 110g includes four three-prong electrical outlets 418, two USB-A ports 420, and two micro USB-C ports 422. Optionally, the electrical charging station 110g includes a platform 424 and/or other structure that facilitates supporting one or more electronic devices while being charged.

Referring again to FIG. 3, an exemplary implementation of the module kit 108d configures the modular compartment 106d to receive component modules 110 of the component type of a warming station (e.g., the hot cup 110da, etc.). The module kit 108d includes the connections, components, and/or the like (e.g., electrical connections, water connections, gas connections, pneumatic connections, hydraulic connections, electrical lines and/or fittings, water lines and/or fittings, gas lines and/or fittings, pneumatic lines and/or fittings, hydraulic lines and/or fittings, mechanical connections, structural connections, conduits, tubes, cables, etc.) that enable operation of the hot cup 110da within the modular compartment 106d. In the exemplary implementation, the module kit 108d includes an electrical connection assembly 182 that is connected to a source of electrical power (not shown). The electrical connection assembly 182 provides the hot cup 110da with an electrical connection to the source electrical power to power operation of the hot cup 110da.

Figure 13:
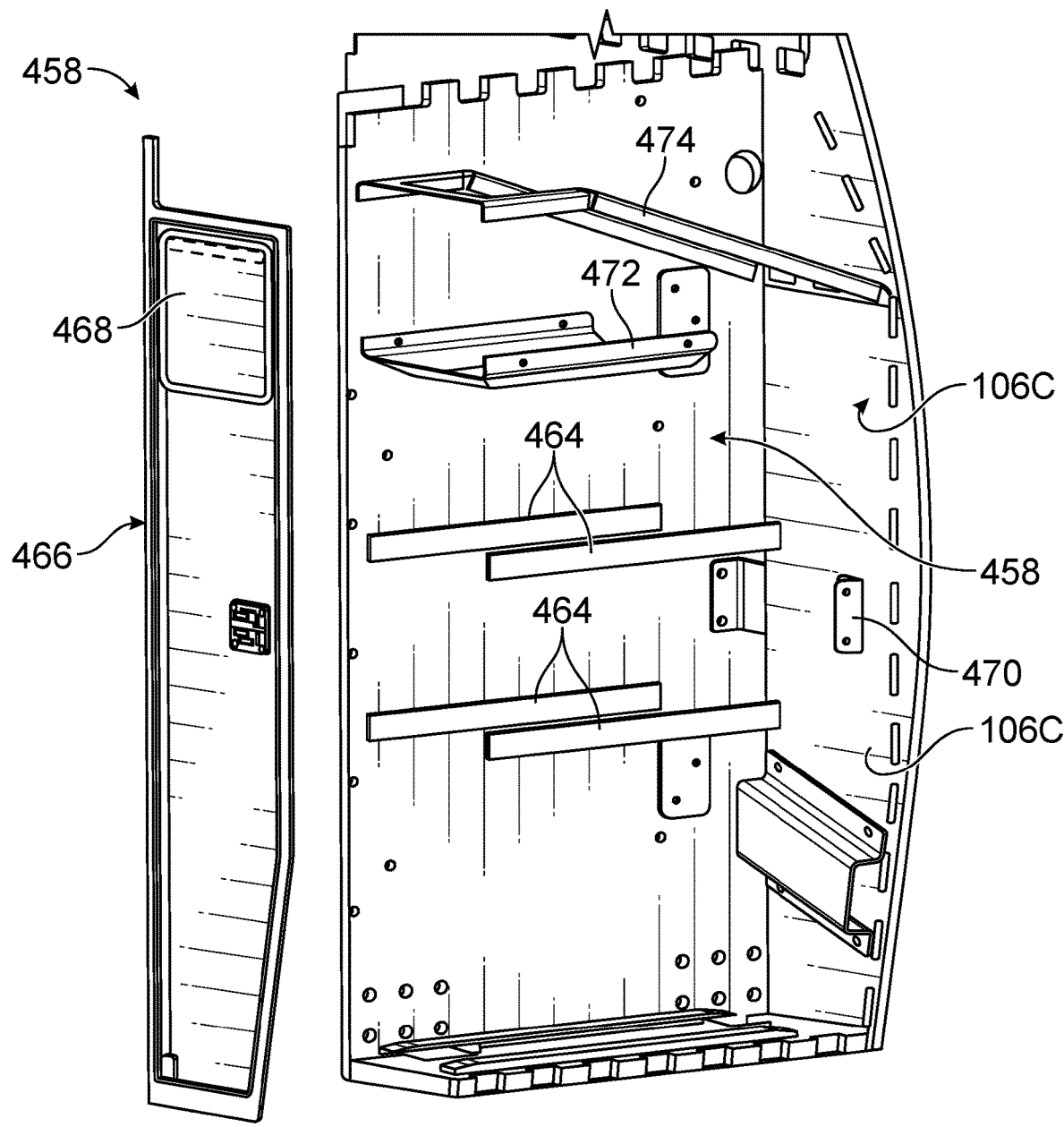
FIG. 13 illustrates a module kit for a full size waste container according to an implementation.

FIG. 13 illustrates a module kit 458 that configures a modular compartment (e.g., the modular compartment 106c, etc.) to receive component modules 110 (not shown in FIG. 13) having the component type of a full size waste container (not shown). The exemplary implementation of the module kit 458 shown in FIG. 13 includes rubstrips 464 and a door assembly 466. The rubstrips 464 are configured to engage the full size waste container to facilitate supporting the waste container in place within the modular compartment 106c. Optionally, the door assembly 466 includes a waste flap 468 that enables a user to insert waste into the waste container through the door assembly 466. In some implementations, the module kit 458 includes a back stop 470 that is configured to limit the depth of the waste container within the modular compartment 106c. The module kit 458 optionally includes a waste chute assembly 472 and/or a plumbing shroud 474.

Figure 14:
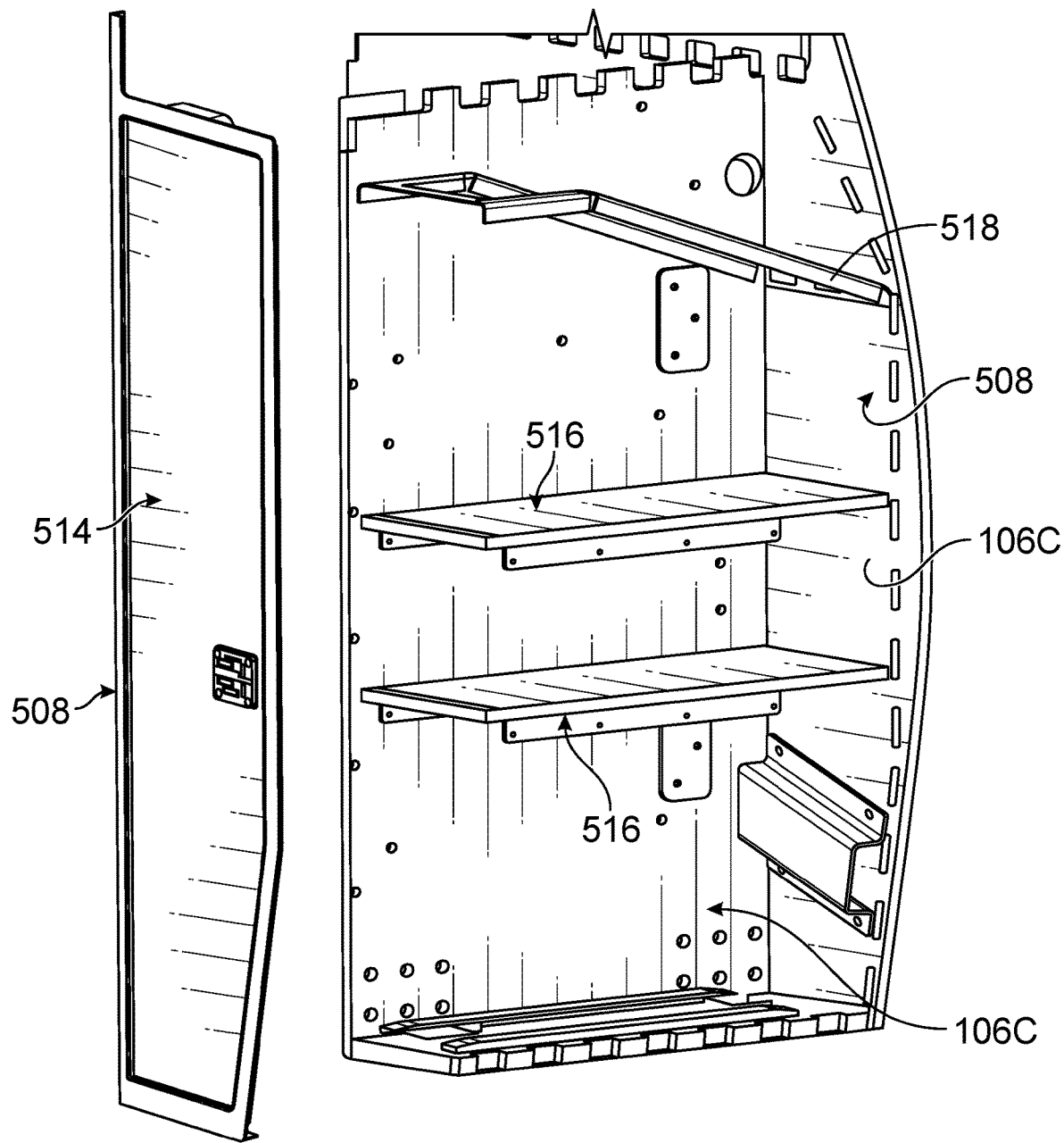
FIG. 14 illustrates a module kit for miscellaneous stowage components according to an implementation.

FIG. 14 illustrates a module kit 508 that configures a modular compartment (e.g., the modular compartment 106c, etc.) to receive component modules 110 having the component type of miscellaneous stowage components (e.g., doors, shelves, trim, panels, dividers, walls, etc.). The module kit 508 thus configures the modular compartment 106c as a miscellaneous stowage compartment. The exemplary implementation of the module kit 508 shown in FIG. 14 includes a door assembly 514, one or more optional shelf assemblies 516, and an optional plumbing shroud 518.

Referring again to FIGS. 2 and 3, an exemplary implementation of the module kit 108*c* configures the modular compartment 106*c* to receive component modules 110 of the component type of ice drawer and waste container (e.g., the ice drawer 110*ca* and the waste container 110*cb*, etc.). The exemplary implementation of the module kit 108*c* shown in FIG. 3 includes rubstrips 564, a door assembly 566, and a drawer cradle assembly 568. The rubstrips 564 are configured to engage the waste container 110*cb* to facilitate supporting the waste container 110*cb* in place within the modular compartment 106*c*. The drawer cradle assembly 568 is configured to support the ice drawer 110*ca* to hold the ice drawer 110*ca* in place within the modular compartment 106*c*.

Optionally, the door assembly 566 includes a waste flap 570 that enables a user to insert waste into the waste container 110*cb* through the door assembly 566. The door assembly 566 optionally includes an opening 572 that enables the ice drawer 110*ca* to be pulled in and out through the door assembly 566. In some implementations, the module kit 108*c* includes a back stop 574 that is configured to limit the depth of the waste container 110*cb* within the modular compartment 106*c*. The module kit 108*c* optionally includes a waste chute assembly 576 and/or a plumbing shroud 578.

Figure 15:
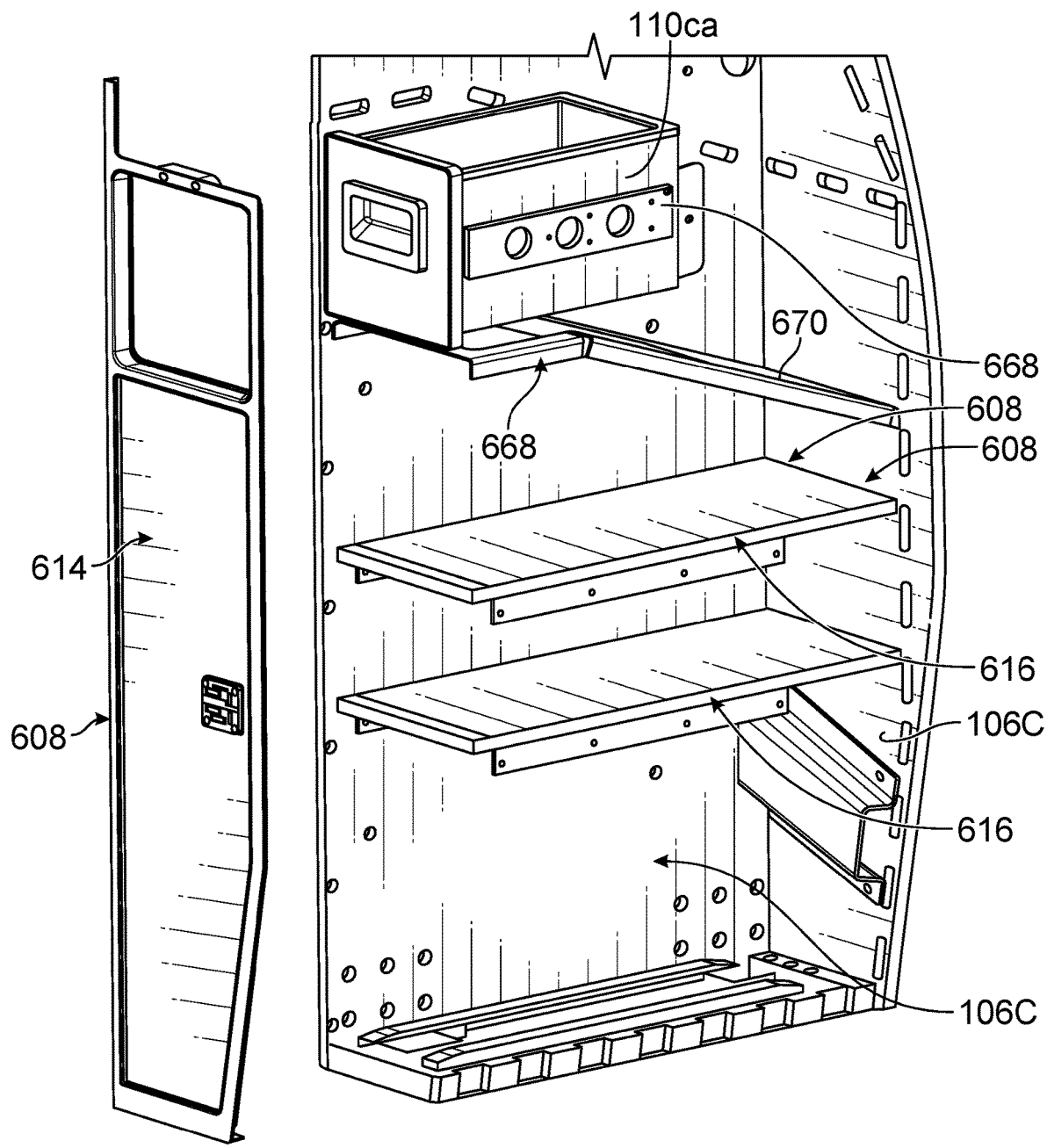
FIG. 15 illustrates a module kit for ice drawer with miscellaneous stowage components according to an implementation.

FIG. 15 illustrates a module kit 608 that configures the modular compartment 106*c* to receive component modules 110 having the component type of ice drawer (e.g., the ice drawer 110*ca*, etc.) with miscellaneous stowage components (e.g., doors, shelves, trim, panels, dividers, walls, etc.). The module kit 608 thus configures the modular compartment 106*c* as a miscellaneous stowage compartment with an ice drawer. The exemplary implementation of the module kit 608 shown in FIG. 15 includes a door assembly 614, one or more optional shelf assemblies 616, a drawer cradle assembly 668, and an optional plumbing shroud 670. The drawer cradle assembly 668 is configured to support the ice drawer 110*ca* to hold the ice drawer 110*ca* in place within the modular compartment 106*c*.

Figure 16:
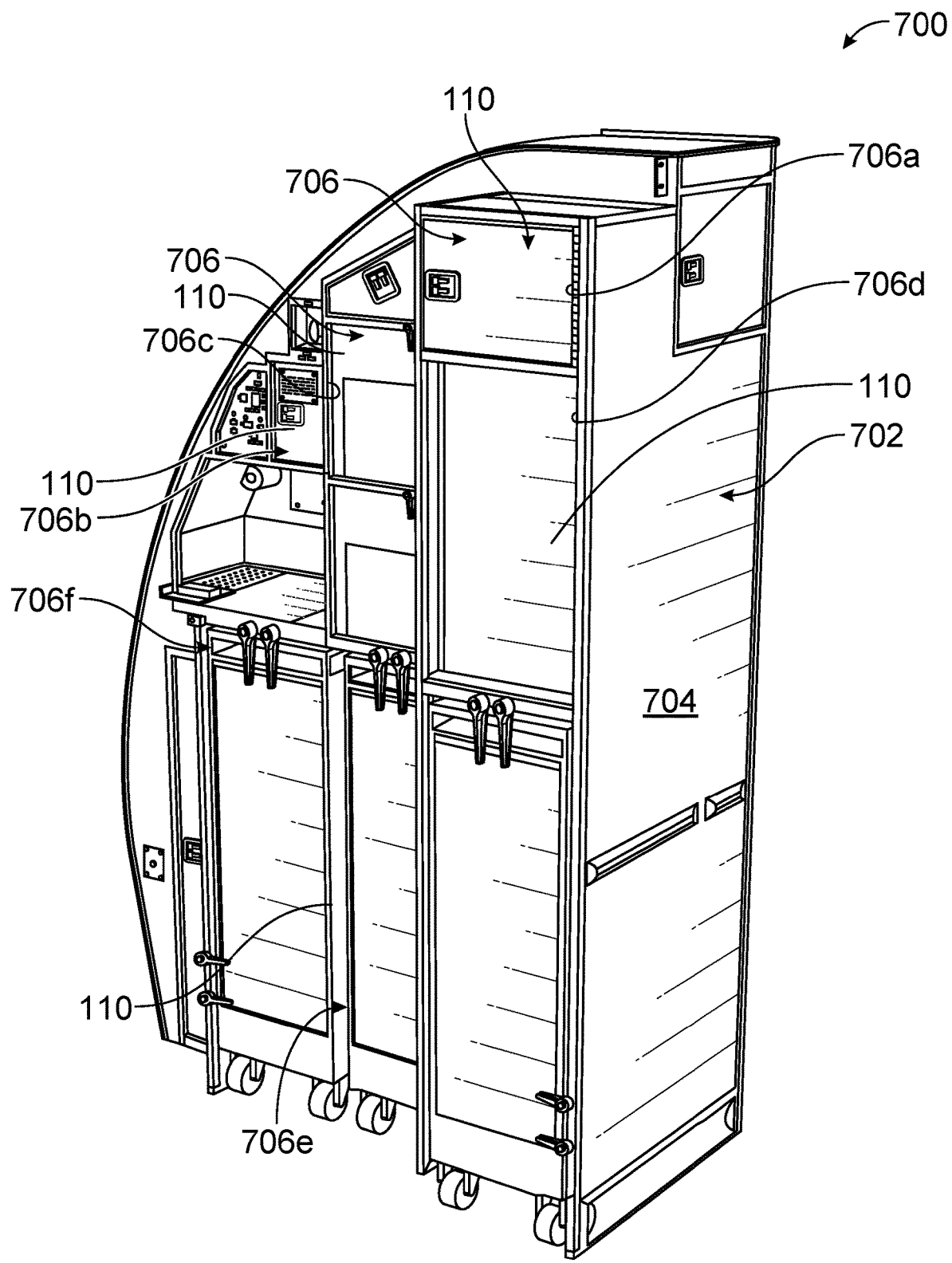
FIG. 16 is an isometric view of a galley assembly for an aircraft according to an implementation.

With references now to FIG. 16, a galley assembly 700 for an aircraft (e.g., the aircraft 1000 shown in FIG. 20, etc.) includes a galley 702 having a frame 704 that includes a plurality of modular compartments 706. The galley assembly 700 includes interchangeable module kits (e.g., the module kits 108, other module kits disclosed herein, etc.) and interchangeable component modules 110. In the exemplary implementation of FIG. 16, the galley 702 includes six modular compartments 706*a*, 706*b*, 706*c*, 706*d*, 706*e*, and 706*f*.

As described above with respect to the galley assembly 100, the module kits are configured to be selectively fit to the modular compartments 706 to configure the modular compartments 706 to receive (i.e., accept) different component types (e.g., families, etc.) of the component modules 110. Accordingly, different module kits can be selectively interchanged within the same modular compartment 706 to selectively configure the modular compartment 706 to receive component modules 110 of different component types.

For example, the galley assembly 700 may include one or more module kits that configure the modular compartment 706*a* to receive miscellaneous stowage component modules 110, electrical charging station modules 110, and/or the like. Turning to the modular compartment 706*b*, the galley assembly 700 may include one or more module kits that configure the modular compartment 706*b* to receive one or more different types of beverage makers modules 110 (e.g., the coffee maker 110*ba* shown in FIG. 1, a tea brewer, a water heater and/or boiler, a hot chocolate maker, an espresso and/or cappuccino maker, a frozen beverage machine, a snow cone machine, etc.), an extended sump module 110, and/or the like.

Moreover, and for example, the galley assembly 700 may include one or more module kits that configure the modular compartment 706*c* to receive stowage unit modules 110 (e.g., standard stowage units, self-contained boxes, etc.), miscellaneous stowage component modules 110 (e.g., doors, shelves, trim, panels, dividers, walls, etc.), and/or the like. In the exemplary implementation of the modular compartment 706*d*, the galley assembly 700 may include one or more module kits that configure the modular compartment 706*d* to receive oven modules 110 (e.g., steam ovens, convection ovens, etc.), refrigerator modules 110, stowage unit modules 110 (e.g., standard stowage units, self-contained boxes, etc.), miscellaneous stowage component modules 110 (e.g., doors, shelves, trim, panels, dividers, walls, etc.), and/or the like. With respect to the modular compartment 706*e*, the galley assembly 700 may include one or more module kits that configure the modular compartment 706*e* to receive an auxiliary table module 110, a cover module 110, and/or the like. In the exemplary implementation of the modular compartment 706*f*, the galley assembly 700 may include one or more module kits that configure the modular compartment 706*f* to receive a pull-out table module 110 (e.g., the pull-out table 110*ea* shown in FIGS. 1 and 9, etc.), a cover module 110 (e.g., the cover module 110*eb* shown in FIG. 9, etc.), and/or the like.

Figure 17:
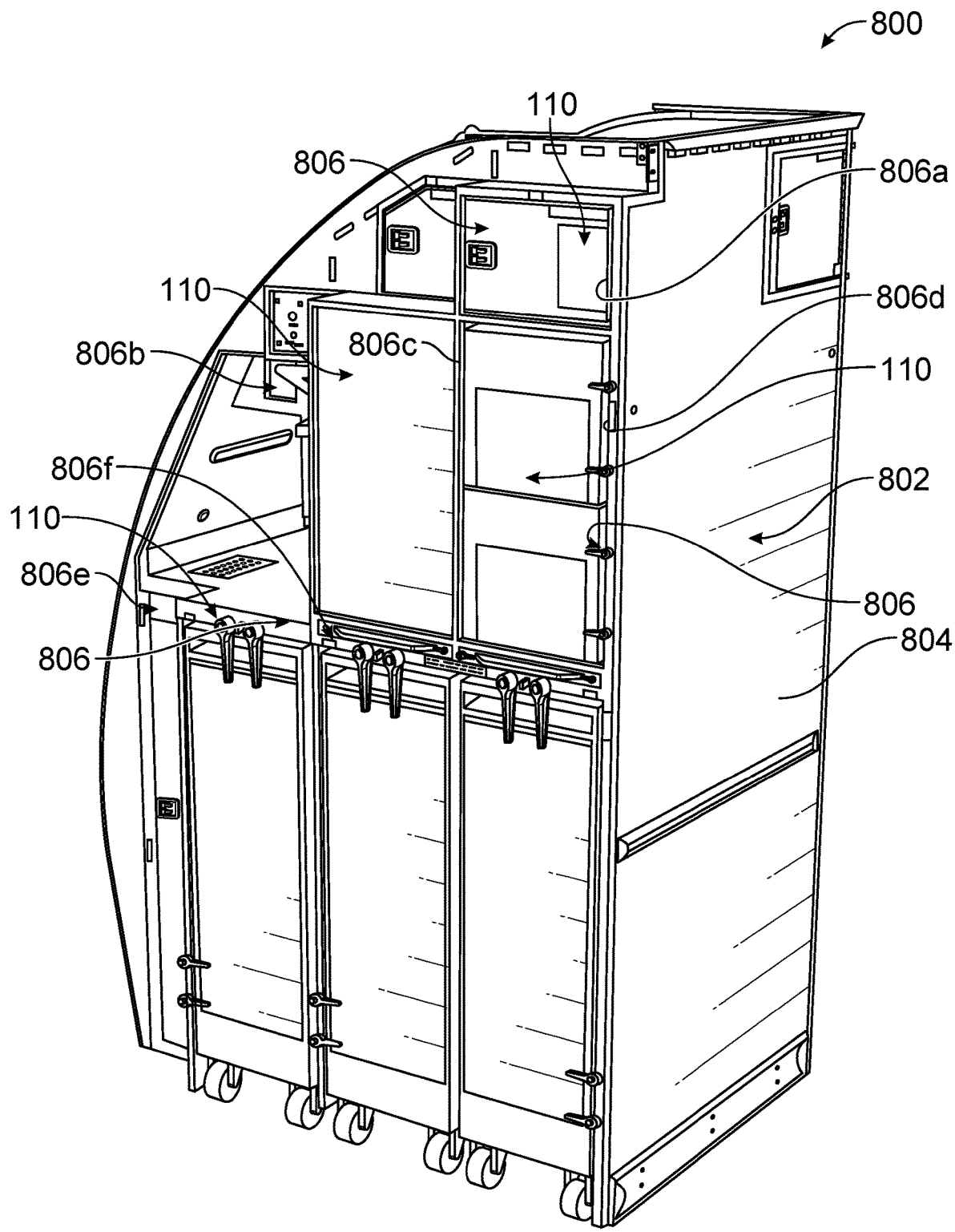
FIG. 17 is an isometric view of a galley assembly for an aircraft according to an implementation.

Referring now to FIG. 17, a galley assembly 800 for an aircraft (e.g., the aircraft 1000 shown in FIG. 20, etc.) includes a galley 802 having a frame 804 that includes a plurality of modular compartments 806. The galley assembly 800 includes interchangeable module kits (e.g., the module kits 108, other module kits disclosed herein, etc.) and interchangeable component modules 110. In the exemplary implementation of FIG. 17, the galley 802 includes six modular compartments 806*a*, 806*b*, 806*c*, 806*d*, 806*e*, and 806*f*.

As described above with respect to the galley assembly 100, the module kits are configured to be selectively fit to the modular compartments 806 to configure the modular compartments 806 to receive (i.e., accept) different component types (e.g., families, etc.) of the component modules 110. Accordingly, different module kits can be selectively interchanged within the same modular compartment 806 to selectively configure the modular compartment 806 to receive component modules 110 of different component types.

For example, the galley assembly 800 may include one or more module kits that configure the modular compartment 806*a* to receive miscellaneous stowage component modules 110, electrical charging station modules 110, stowage unit modules 110 (e.g., standard stowage units, self-contained boxes, etc.), and/or the like. Turning to the modular compartment 806*b*, the galley assembly 800 may include one or more module kits that configure the modular compartment 806*b* to receive one or more different types of beverage makers modules 110 (e.g., the coffee maker 110*ba* shown in FIG. 1, a tea brewer, a water heater and/or boiler, a hot chocolate maker, an espresso and/or cappuccino maker, a frozen beverage machine, a snow cone machine, etc.), an extended sump module 110, and/or the like.

Moreover, and for example, the galley assembly 800 may include one or more module kits that configure the modular compartment 806c to receive oven modules 110 (e.g., steam ovens, convection ovens, etc.), refrigerator modules 110, stowage unit modules 110 (e.g., standard stowage units, self-contained boxes, etc.), miscellaneous stowage component modules 110 (e.g., doors, shelves, trim, panels, dividers, walls, etc.), and/or the like. The galley assembly 800 may include one or more module kits that configure the modular compartment 806d to receive oven modules 110 (e.g., steam ovens, convection ovens, etc.), refrigerator modules 110, stowage unit modules 110 (e.g., standard stowage units, self-contained boxes, etc.), miscellaneous stowage component modules 110 (e.g., doors, shelves, trim, panels, dividers, walls, etc.), and/or the like.

With respect to the modular compartment 806e, the galley assembly 800 may include one or more module kits that configure the modular compartment 806e to receive an auxiliary table module 110, a cover module 110, and/or the like. In the exemplary implementation of the modular compartment 806f, the galley assembly 800 may include one or more module kits that configure the modular compartment 806f to receive a pull-out table module 110 (e.g., the pull-out table 110ea shown in FIGS. 1 and 9, etc.), a cover module 110 (e.g., the cover module 110eb shown in FIG. 9, etc.), and/or the like.

Figure 18:
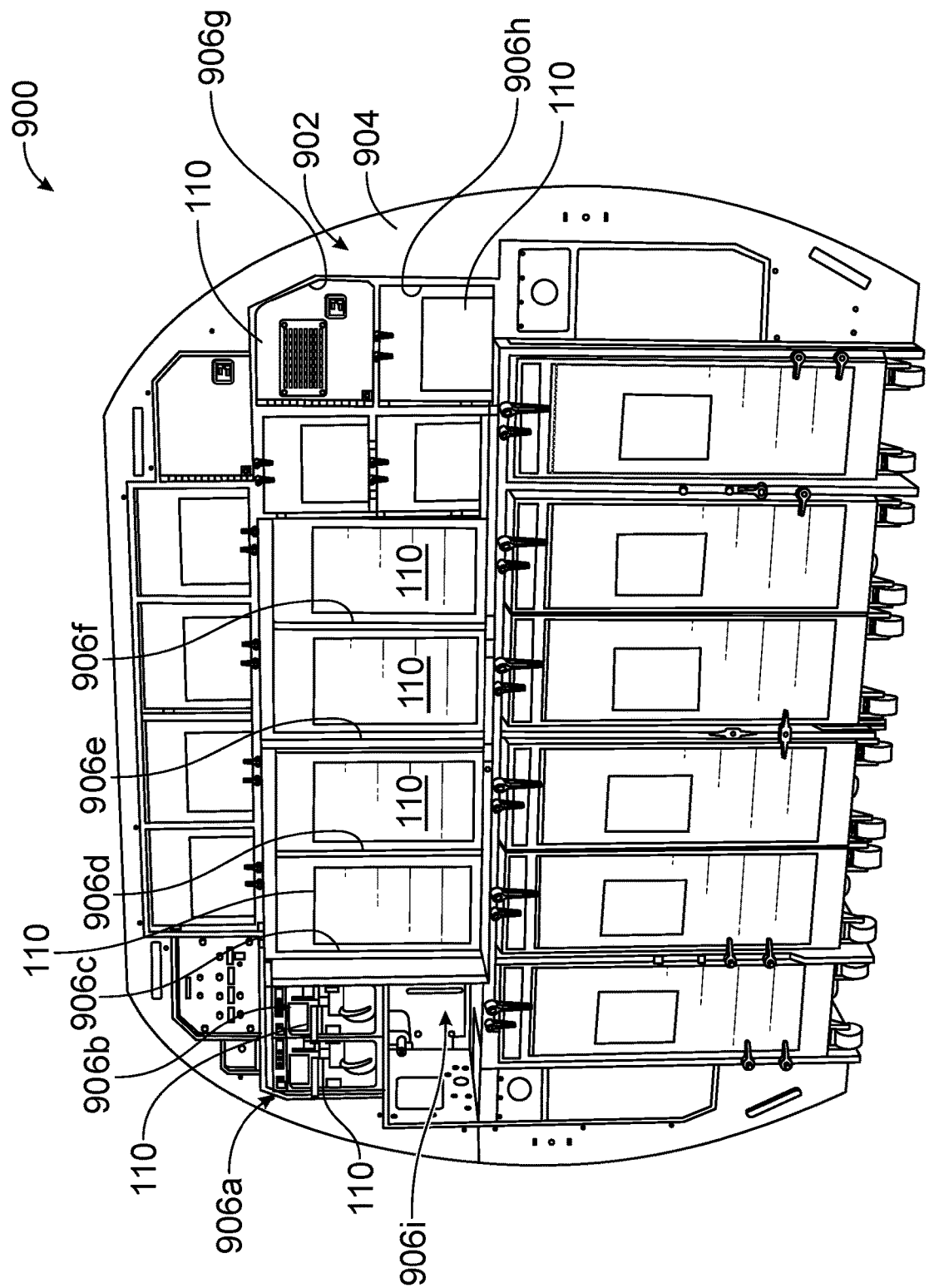
FIG. 18 is an isometric view of a galley assembly for an aircraft according to an implementation.

Referring now to FIG. 18, a galley assembly 900 for an aircraft (e.g., the aircraft 1000 shown in FIG. 20, etc.) includes a galley 902 having a frame 904 that includes a plurality of modular compartments 906. The galley assembly 900 includes interchangeable module kits (e.g., the module kits 108, other module kits disclosed herein, etc.) and interchangeable component modules 110. In the exemplary implementation of FIG. 18, the galley 902 includes ten modular compartments 906a, 906b, 906c, 906d, 906e, 906f, 906g, 906h, 906i, and 906j.

As described above with respect to the galley assembly 100, the module kits are configured to be selectively fit to the modular compartments 906 to configure the modular compartments 906 to receive (i.e., accept) different component types (e.g., families, etc.) of the component modules 110. Accordingly, different module kits can be selectively interchanged within the same modular compartment 906 to selectively configure the modular compartment 906 to receive component modules 110 of different component types.

For example, the galley assembly 900 may include one or more module kits that configure the modular compartment 906a to receive one or more different types of beverage makers modules 110 (e.g., the coffee maker 110ba shown in FIG. 1, a tea brewer, a water heater and/or boiler, a hot chocolate maker, an espresso and/or cappuccino maker, a frozen beverage machine, a snow cone machine, etc.), an extended sump module 110, and/or the like. Moreover, and for example, the galley assembly 900 may include one or more module kits that configure the modular compartment 906b to receive one or more different types of beverage makers modules 110 (e.g., the coffee maker 110ba shown in FIG. 1, a tea brewer, a water heater and/or boiler, a hot chocolate maker, an espresso and/or cappuccino maker, a frozen beverage machine, a snow cone machine, etc.), an extended sump module 110, and/or the like.

In the exemplary implementation of the modular compartment 906c, the galley assembly 900 may include one or more module kits that configure the modular compartment 906c to receive oven modules 110 (e.g., steam ovens, convection ovens, etc.), refrigerator modules 110, stowage unit modules 110 (e.g., standard stowage units, self-contained boxes, etc.), miscellaneous stowage component modules 110 (e.g., doors, shelves, trim, panels, dividers, walls, etc.), and/or the like. Similarly, the galley assembly 900 may include one or more module kits that configure each of the modular compartments 906d, 906e, and 906f to receive oven modules 110 (e.g., steam ovens, convection ovens, etc.), refrigerator modules 110, stowage unit modules 110 (e.g., standard stowage units, self-contained boxes, etc.), miscellaneous stowage component modules 110 (e.g., doors, shelves, trim, panels, dividers, walls, etc.), and/or the like.

Referring now to the modular compartment 906g, the galley assembly 900 may include one or more module kits that configure the modular compartment 906g to receive miscellaneous stowage component modules 110, electrical charging station modules 110, and/or the like. In the exemplary implementation of the modular compartment 906h, the galley assembly 900 may include one or more module kits that configure the modular compartment 906h to receive miscellaneous stowage component modules 110, ice drawer modules 110, electrical charging station modules 110, and/or the like. In the exemplary implementation of the modular compartment 906i, the galley assembly 900 may include one or more module kits that configure the modular compartment 906i to receive a warming station module 110 (e.g., the hot cup 110da, etc.), and electrical charging station module 110, and/or the like. With respect to the modular compartment 906j, the galley assembly 900 may include one or more module kits that configure the modular compartment 906j to receive a folding table module 110, a cover module 110, and/or the like.

Figure 19:
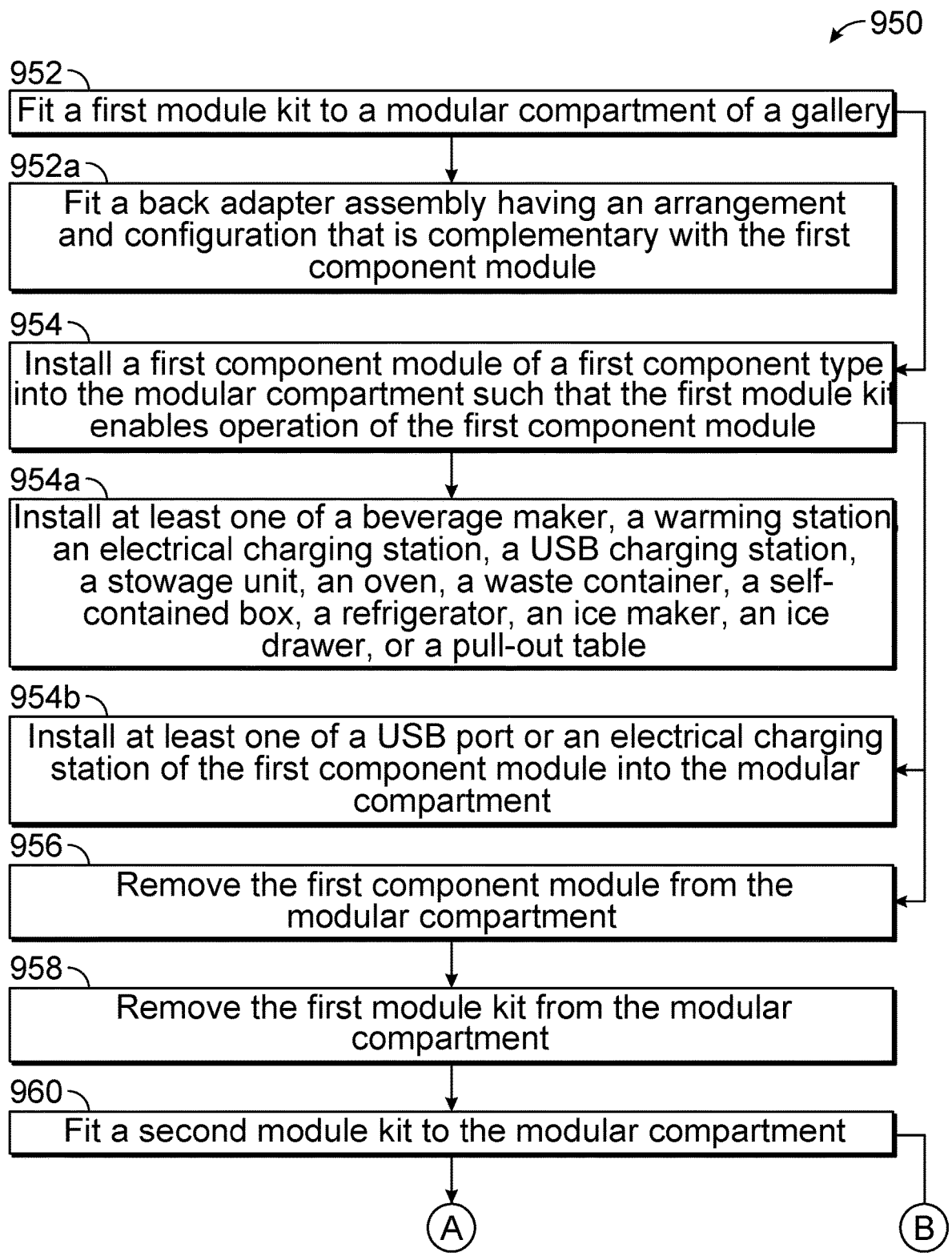
FIG. 19 is a flow chart illustrating a method of configuring a galley of an aircraft according to an implementation.
Figure 19:
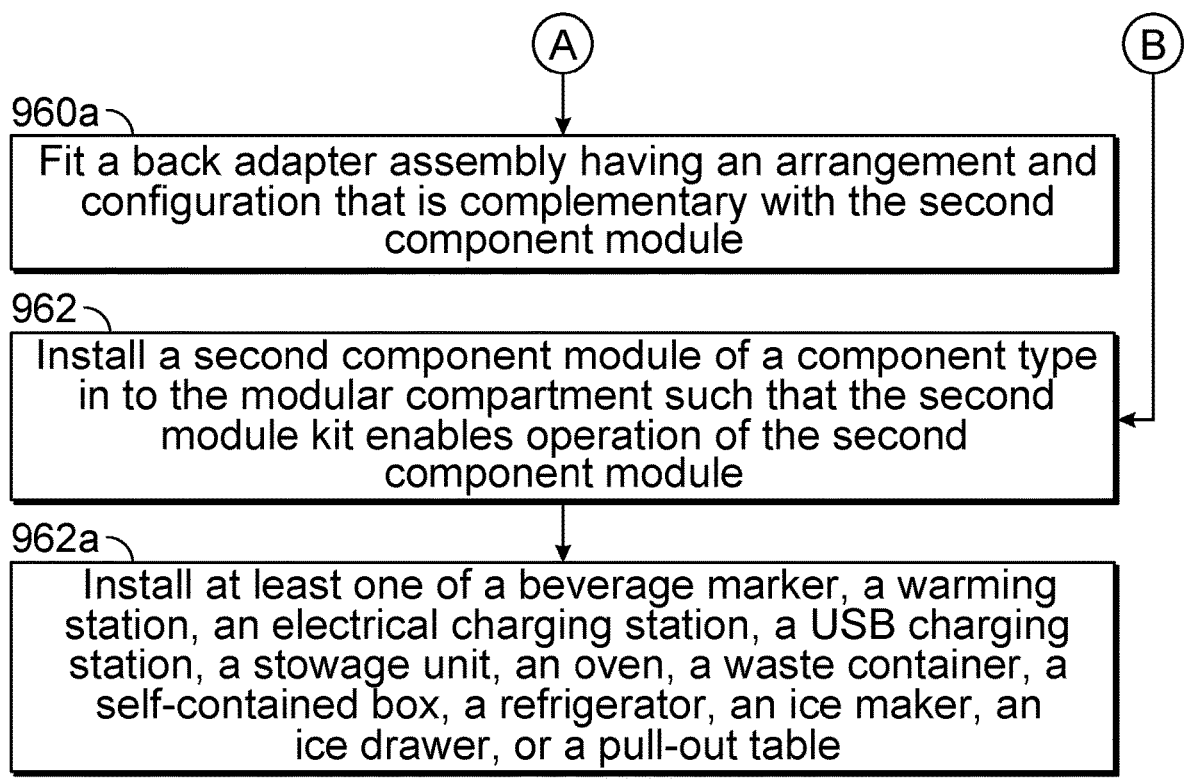

FIG. 19 illustrates a method 950 of configuring a galley (e.g., the galley 102 shown in FIGS. 1-3, the galley assembly 700 shown in FIG. 16, the galley assembly 800 shown in FIG. 17, the galley assembly 900 shown in FIG. 18, etc.) of an aircraft (e.g., the aircraft 1000 shown in FIG. 20, etc.) according to an implementation. The method 950 includes fitting, at 952, a first module kit to a modular compartment of the galley. At 954, the method 950 includes installing a first component module of a first component type into the modular compartment such that the first module kit enables operation of the first component module. At 956, the method 950 includes removing the first component module from the modular compartment.

At 958, the method 950 includes removing the first module kit from the modular compartment. The method 950 includes fitting, at 960, a second module kit to the modular compartment. At 962, the method 950 includes installing a second component module of a second component type into the modular compartment such that the second module kit enables operation of the second component module.

In some implementations, fitting at 952 the first module kit to the modular compartment includes fitting, at 952a, a back adapter assembly having an arrangement and configuration that is complementary with the first component module. In addition or alternatively, fitting at 960 the second module kit to the modular compartment includes fitting, at 960a, a back adapter assembly having an arrangement and configuration that is complementary with the second component module.

Optionally, installing at 954 the first component module into the modular compartment includes installing, at 954a, at least one of a beverage maker, a warming station, an electrical charging station, a USB charging station, a stowage unit, an oven, a waste container, a self-contained box, a refrigerator, an ice maker, an ice drawer, or a pull-out table. In addition or alternatively, installing at 962 the second component module into the modular compartment includes installing, at 962*a*, at least one of a beverage maker, a warming station, an electrical charging station, a USB charging station, a stowage unit, an oven, a waste container, a self-contained box, a refrigerator, an ice maker, an ice drawer, or a pull-out table.

In some implementations, the first module kit includes an electrical connection to a source of electrical power and installing at 954 the first component module of the first component type into the modular compartment includes installing, at 954*b*, at least one of a USB port or an electrical charging station of the first component module into the modular compartment.

Figure 20:
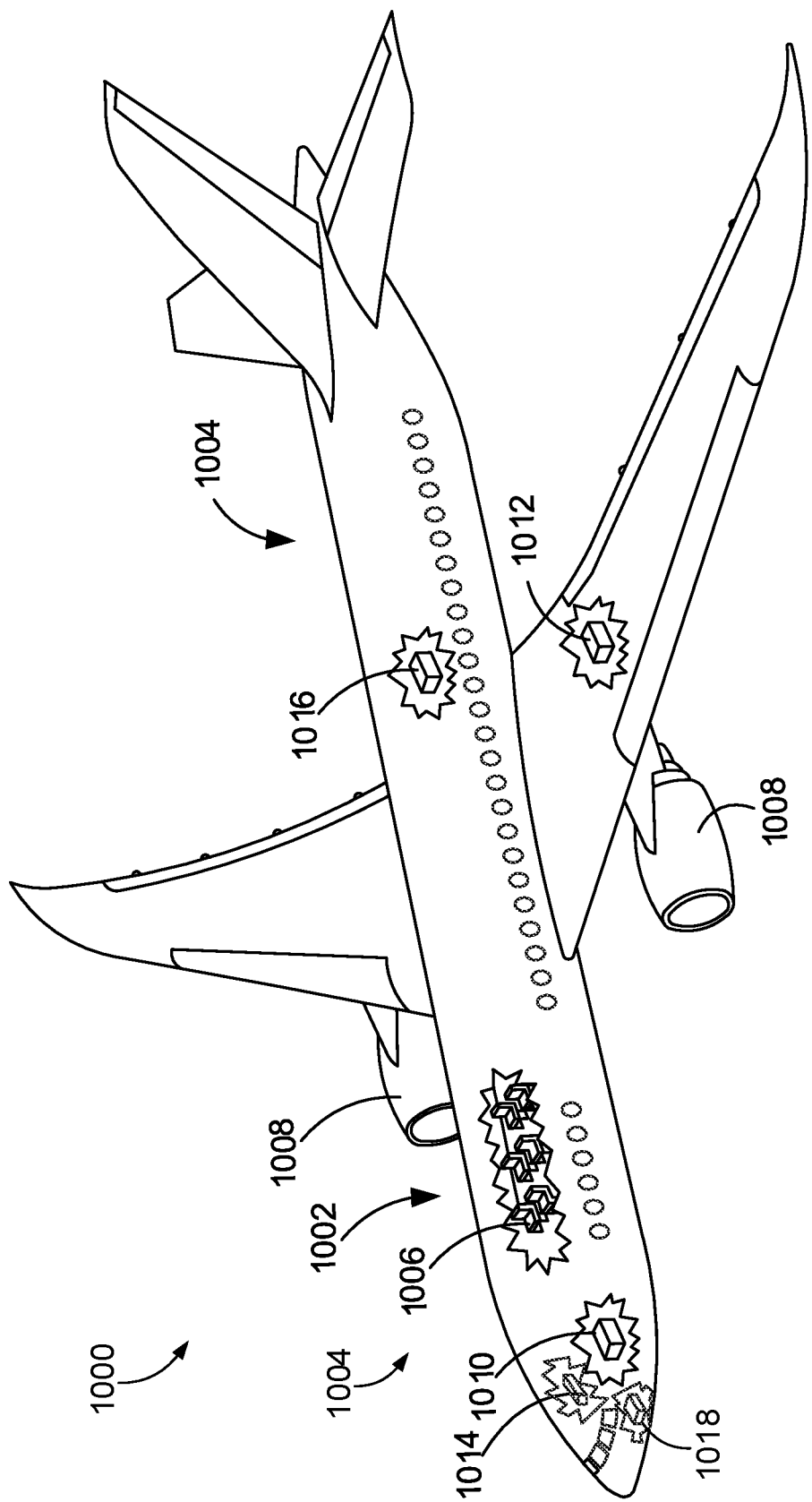
FIG. 20 is a schematic view of an implementation of an aircraft.

Referring now to FIG. 20, examples of the present application may be described in the context of a modular galley of an aircraft 1000 that includes an airframe 1002. The aircraft 1000 includes a plurality of high-level systems 1004 and an interior 1006. Examples of high-level systems 1004 include one or more of a propulsion system 1008, an electrical system 1010, a hydraulic fluid system 1012, a control system 1014, and an environmental system 1016. Any number of other systems can be included. Although a fixed wing passenger aircraft is shown, the galley assemblies disclosed herein can be used with any other type of aircraft, such as, but not limited to, transport aircraft, military aircraft, rotorcraft (e.g., helicopters, etc.), lighter than air vehicles (e.g., balloons, etc.), and/or the like. Moreover, although an aerospace example is shown, the present application can be applied to other industries, such as, but not limited to, the automotive industry, the marine industry, etc.

The following clauses describe further aspects:

Clause Set A:

A1. A galley assembly for an aircraft, the galley assembly comprising:
- a galley comprising a frame having modular compartments;
- a first module kit configured to be fit to at least one of the modular compartments, the first module kit configuring the at least one modular compartment to receive a first component module of a first component type; and
- a second module kit configured to be fit to the at least one modular compartment, the second module kit configuring the at least one modular compartment to receive a second component module of a second component type that is different than the first component type.

A2. The galley assembly of any preceding clause, wherein the first module kit comprises an electrical connection to a source of electrical power such that the first module kit configures the at least one modular compartment to receive a Universal Serial Bus (USB) port of the first component module.

A3. The galley assembly of any preceding clause, wherein the first module kit comprises an electrical connection to a source of electrical power such that the first module kit configures the at least one modular compartment to receive an electrical charging station of the first component module.

A4. The galley assembly of any preceding clause, wherein the first and second module kits comprise rubstrips that are configured to extend within between the frame of the galley and the respective first and second component modules.

A5. The galley assembly of any preceding clause, wherein each of the first and second module kits comprises at least one of a rubstrip, a shelf, a bracket, a rail, a back wall assembly, a divider, a mating pin, a drip tray, trim, a screen, a door, a stop, a fastener, a fitting, a conduit, a tube, a cable, a gas line, a water line, an air line, a refrigerant line, a drain, or a sump assembly.

A6. The galley assembly of any preceding clause, wherein each of the first and second module kits comprises a back adapter assembly having an arrangement and configuration that is complementary with the respective first and second component module.

A7. The galley assembly of any preceding clause, wherein each of the first and second module kits comprises a back adapter assembly that includes a panel and at least one of a gas plumbing fitting, a refrigerant plumbing fitting, or a water plumbing fitting mounted to the panel.

A8. The galley assembly of any preceding clause, wherein at least one of the first module kit or the second module kit comprises an oven bracket that is configured to selectively mate with an oven of the first component module and a stowage container of the first component module.

A9. The galley assembly of any preceding clause, wherein at least one of the first module kit or the second module kit comprises a sump assembly that includes an air gap that extends between a drain sub-assembly of the sump assembly and a drain of the galley.

A10. The galley assembly of any preceding clause, wherein each of the first and second component types includes at least one of a beverage maker, an electrical charging station, a USB charging station, a stowage unit, an oven, a waste container, a self-contained box, a refrigerator, an ice maker, an ice drawer, or a pull-out table.

Clause Set B:

B1. An aircraft comprising:
- an airframe; and
- a galley assembly held by the airframe, the galley assembly comprising:
  - a galley including a frame having modular compartments;
  - a first module kit configured to be fit to at least one of the modular compartments, the first module kit configuring the at least one modular compartment to receive a first component module therein; and
  - a second module kit configured to be fit to the at least one modular compartment, the second module kit configuring the at least one modular compartment to receive a second component module therein, wherein the first and second component modules are of different first and second component types, respectively.

B2. The aircraft of any preceding clause, wherein the first module kit comprises an electrical connection to a source of electrical power such that the first module kit configures the at least one modular compartment to receive at least one of an electrical charging station or a USB port of the first component module.

B3. The aircraft of any preceding clause, wherein each of the first and second module kits comprises at least one of a rubstrip, a shelf, a bracket, a rail, a back wall assembly, a divider, a mating pin, a drip tray, trim, a screen, a door, a stop, a fastener, a fitting, a conduit, a tube, a cable, a gas line, a water line, an air line, a refrigerant line, a drain, or a sump assembly.

B4. The aircraft of any preceding clause, wherein each of the first and second module kits comprises a back adapter assembly having an arrangement and configuration that is complementary with the respective first and second component module.

B5. The aircraft of any preceding clause, wherein each of the first and second module kits comprises a back adapter assembly that includes a panel and at least one of a gas plumbing fitting, a refrigerant plumbing fitting, or a water plumbing fitting mounted to the panel.

B6. The aircraft of any preceding clause, wherein each of the first and second component types comprises at least one of a beverage maker, an electrical charging station, a USB charging station, a stowage unit, an oven, a waste container, a self-contained box, a refrigerator, an ice maker, an ice drawer, or a pull-out table.

Clause Set C:

C1. A method of configuring a galley of an aircraft, the method comprising:

fitting a first module kit to a modular compartment of the galley;

installing a first component module of a first component type into the modular compartment such that the first module kit enables operation of the first component module;

removing the first component module from the modular compartment;

removing the first module kit from the modular compartment;

fitting a second module kit to the modular compartment; and installing a second component module of a second component type into the modular compartment such that the second module kit enables operation of the second component module.

C2. The method of any preceding clause, wherein the first module kit comprises an electrical connection to a source of electrical power and installing the first component module of the first component type into the modular compartment comprises installing at least one of a USB port or an electrical charging station of the first component module into the modular compartment.

C3. The method of any preceding clause, wherein at least one of fitting the first module kit or the second module kit to the modular compartment comprises fitting a back adapter assembly having an arrangement and configuration that is complementary with the respective first or second component module.

C4. The method of any preceding clause, wherein at least one of installing the first component module or the second component module into the modular compartment comprises installing at least one of a beverage maker, a warming station, an electrical charging station, a USB charging station, a stowage unit, an oven, a waste container, a self-contained box, a refrigerator, an ice maker, an ice drawer, or a pull-out table.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one implementation or can relate to several implementations. The implementations are not limited to those that solve any or all of the stated problems or those that have any or all of the stated benefits and advantages. It will further be understood that reference to 'an' item refers to one or more of those items.

The order of execution or performance of the operations in examples of the present application illustrated and described herein is not essential, unless otherwise specified. That is, the operations can be performed in any order, unless otherwise specified, and examples of the application can include additional or fewer operations than those disclosed herein. For example, it is contemplated that executing or performing a particular operation before, contemporaneously with, or after another operation (e.g., different steps, etc.) is within the scope of aspects and implementations of the application.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Accordingly, and for example, unless explicitly stated to the contrary, implementations "comprising" or "having" an element or a plurality of elements having a particular property can include additional elements not having that property. Further, references to "one implementation" or "an implementation" are not intended to be interpreted as excluding the existence of additional implementations that also incorporate the recited features. The term "exemplary" is intended to mean "an example of".

When introducing elements of aspects of the application or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one." Accordingly, and for example, as used herein, an element or step recited in the singular and preceded by the word "a" or "an" should be understood as not necessarily excluding the plural of the elements or steps.

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the application in detail, it will be apparent that modifications and variations are possible without departing from the scope of aspects of the application as defined in the appended claims. As various changes could be made in the above constructions, products, and methods without departing from the scope of aspects of the application, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations of the application without departing from their scope. While the dimensions and types of materials described herein are intended to define the parameters of the various implementations of the application, the implementations are by no means limiting and are example implementations. Many other implementations will be apparent to those of ordinary skill in the art upon reviewing the above description. The scope of the various implementations of the application should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the application, including the best mode, and also to enable any person of ordinary skill in the art to practice the various implementations of the application, including making and using any devices or systems and performing any incorporated methods. The patentable scope of the various implementations of the application is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A galley assembly for an aircraft, the galley assembly comprising:
   a galley comprising a frame having modular compartments;
   a first interchangeable module kit configured to be fit to at least one of the modular compartments, the first interchangeable module kit comprising a shelf assembly to facilitate receipt of a first component module comprising at least one stowage unit in the at least one modular compartment; and
   a second interchangeable module kit, selectively interchangeable with the first interchangeable module kit, configured to be fit to the at least one modular compartment, the second interchangeable module kit comprising a back adapter assembly that facilitates receipt of a second component module comprising an oven module in the at least one modular compartment.

2. The galley assembly of claim 1, wherein the first interchangeable module kit further comprises at least one rubstrip configured to engage the at least one stowage unit to facilitate support of the at least one stowage unit in place within the at least one modular compartment.

3. The galley assembly of claim 1, wherein the shelf assembly comprises a shelf to divide the at least one modular compartment into sub-compartments configured to receive and hold the at least one stowage unit therein.

4. The galley assembly of claim 3, wherein the shelf assembly comprises a back stop held by the shelf, the back stop being configured to limit the depth of the at least one stowage unit within a corresponding one of the sub-compartments.

5. The galley assembly of claim 3, further comprising a predetermined clearance between the shelf assembly and side walls of the frame that define the at least one modular compartment to facilitate insertion of the shelf assembly into, and removal the shelf assembly from, the at least one modular compartment.

6. The galley assembly of claim 1, wherein the back adapter assembly includes a panel and at least one of a gas plumbing fitting, a refrigerant plumbing fitting, or a water plumbing fitting mounted to the panel that enable operation of the oven module within the at least one modular compartment.

7. The galley assembly of claim 1, further comprising an oven bracket having one or more openings to facilitate selective mating with the first interchangeable module kit and the second interchangeable module kit.

8. An aircraft, comprising:
an airframe; and
a galley assembly held by the airframe, the galley assembly comprising:
 a galley including a frame having modular compartments;
 a first interchangeable module kit configured to be fit to at least one of the modular compartments, the first interchangeable module kit comprising a shelf assembly to facilitate receipt of a first component module comprising at least one stowage unit in the at least one modular compartment; and
 a second interchangeable module kit, selectively interchangeable with the first interchangeable module kit, configured to be fit to the at least one modular compartment, the second module kit comprising a back adapter assembly that facilitates receipt of a second component module comprising an oven module in the at least one modular compartment.

9. The aircraft of claim 8, wherein the first interchangeable module kit further comprises at least one rubstrip configured to engage the at least one stowage unit to facilitate support of the at least one stowage unit in place within the at least one modular compartment.

10. The aircraft of claim 8, wherein the shelf assembly comprises a shelf to divide the at least one modular compartment into sub-compartments configured to receive and hold the at least one stowage unit therein.

11. The aircraft of claim 10, wherein the shelf assembly comprises a back stop held by the shelf, the back stop being configured to limit the depth of the at least one stowage unit within a corresponding one of the sub-compartments.

12. The aircraft of claim 10, further comprising a predetermined clearance between the shelf assembly and side walls of the frame that define the at least one modular compartment to facilitate insertion of the shelf assembly into, and removal the shelf assembly from, the modular compartment.

13. The aircraft of claim 10, wherein the back adapter assembly includes a panel and at least one of a gas plumbing fitting, a refrigerant plumbing fitting, or a water plumbing fitting mounted to the panel that enable operation of the oven module within the at least one modular compartment.

14. The aircraft of claim 8, further comprising an oven bracket having one or more openings to facilitate selective mating with the first interchangeable module kit and the second interchangeable module kit.

15. A method of configuring a galley of an aircraft, the method comprising:
 fitting a first interchangeable module kit to a modular compartment of the galley, the first interchangeable module kit comprising a shelf assembly to receive and hold a first component module comprising at least one stowage unit in the modular compartment;
 installing the at least one stowage unit into the modular compartment such that the shelf assembly enables operation of the at least one stowage unit;
 removing the at least one stowage unit from the modular compartment;
 removing the first interchangeable module kit from the modular compartment;
 fitting a second interchangeable module kit comprising a back adapter assembly, selectively interchangeable with the first interchangeable module kit, to the modular compartment; and
 installing a second component module comprising an oven module into the modular compartment such that the back adapter assembly enables operation of the oven module within the modular compartment.

16. The method of claim 15, wherein the first interchangeable module kit further comprises at least one rubstrip configured to engage the at least one stowage unit to facilitate support of the at least one stowage unit in place within the modular compartment.

17. The method of claim 15, wherein the shelf assembly comprises a shelf to divide the modular compartment into sub-compartments configured to receive and hold the at least one stowage unit therein.

18. The method of claim 17, wherein the shelf assembly comprises a back stop held by the shelf, the back stop being configured to limit the depth of the at least one stowage unit within a corresponding one of the sub-compartments.

19. The method of claim 18, further comprising establishing a predetermined clearance between the shelf assembly and side walls of the frame that define the modular compartment to facilitate insertion of the shelf assembly into, and removal the shelf assembly from, the modular compartment.

20. The method of claim 15, wherein the back adapter assembly includes a panel and at least one of a gas plumbing fitting, a refrigerant plumbing fitting, or a water plumbing fitting mounted to the panel that enable operation of the oven module within the at least one modular compartment.

* * * * *